(12) United States Patent
Testa

(10) Patent No.: US 7,963,448 B2
(45) Date of Patent: Jun. 21, 2011

(54) HAND HELD MACHINE VISION METHOD AND APPARATUS

(75) Inventor: Justin Testa, Wellesley, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 1325 days.

(21) Appl. No.: 11/123,480

(22) Filed: May 6, 2005

(65) Prior Publication Data
US 2006/0131418 A1 Jun. 22, 2006

Related U.S. Application Data

(63) Continuation-in-part of application No. 11/020,640, filed on Dec. 22, 2004, now abandoned.

(51) Int. Cl.
*G06K 7/10* (2006.01)

(52) U.S. Cl. .............. 235/472.01; 340/10.1; 340/572.1; 235/435; 235/487

(58) Field of Classification Search .............. 235/472.01
See application file for complete search history.

(56) References Cited

U.S. PATENT DOCUMENTS

| | | |
|---|---|---|
| 3,868,634 A | 2/1975 | Dolch |
| 3,890,597 A | 6/1975 | Hanchett |
| 4,282,425 A | 8/1981 | Chadima, Jr. et al. |
| 4,308,455 A | 12/1981 | Bullis et al. |
| 4,408,344 A | 10/1983 | McWaters |
| 4,421,978 A | 12/1983 | Laurer et al. |
| 4,542,548 A | 9/1985 | Marazzini |
| 4,782,220 A | 11/1988 | Shuren |
| 4,866,784 A | 9/1989 | Barski |
| 4,894,523 A | 1/1990 | Chadima, Jr. et al. |
| 4,948,955 A | 8/1990 | Lee et al. |
| 4,973,829 A | 11/1990 | Ishida et al. |
| 5,028,772 A | 7/1991 | Lapinski et al. |
| 5,053,609 A | 10/1991 | Priddy et al. |
| 5,120,940 A | 6/1992 | Willsie |
| 5,124,537 A | 6/1992 | Chandler et al. |
| 5,124,538 A | 6/1992 | Lapinski et al. |
| 5,155,343 A | 10/1992 | Chandler et al. |
| 5,163,104 A | 11/1992 | Ghosh et al. |
| 5,166,830 A | 11/1992 | Ishibai et al. |
| 5,187,355 A | 2/1993 | Chadima, Jr et al. |

(Continued)

FOREIGN PATENT DOCUMENTS

DE 10012715 9/2000

(Continued)

OTHER PUBLICATIONS http://www.merriam-webster.com/dictionary/optimal, Oct. 27, 2008, 1 page.
Rolls-Royce, Direct Part Marking, Implementation Guide, Issue 1—Vcom 9897, Jun. 2004.
Cognex Corporation, Implementing Direct Par Mark Identification: 10 Important Considerations ID Products, Ref. pp. 1-12, Publication Date Apr. 2004.

(Continued)

*Primary Examiner* — Daniel Walsh
*Assistant Examiner* — Tae Kim
(74) *Attorney, Agent, or Firm* — Michael A. Jaskolski

(57) ABSTRACT

A method and system for use with a portable device including a processor, at least some embodiments of the method including the steps of providing an identification tag on at least one item that includes item identifying information, obtaining item identifying information from the identification tag via the portable device, obtaining at least one image of the at least one item via the portable device and performing a supplemental process using the identifying information and the at least one image.

15 Claims, 15 Drawing Sheets

U.S. PATENT DOCUMENTS

| | | | |
|---|---|---|---|
| 5,187,356 A | 2/1993 | Chadima, Jr. et al. |
| 5,192,856 A | 3/1993 | Schaham et al. |
| 5,198,650 A | 3/1993 | Wike et al. |
| 5,262,623 A | 11/1993 | Batterman et al. |
| 5,262,625 A | 11/1993 | Tom et al. |
| 5,262,626 A | 11/1993 | Goren et al. |
| 5,276,315 A | 1/1994 | Surka |
| 5,276,316 A | 1/1994 | Blanford |
| 5,278,397 A | 1/1994 | Barkan et al. |
| 5,286,960 A | 2/1994 | Longacre, Jr. et al. |
| 5,291,008 A | 3/1994 | Havens et al. |
| 5,296,690 A | 3/1994 | Chandler et al. |
| 5,304,786 A | 4/1994 | Pavlidis et al. |
| 5,304,787 A | 4/1994 | Wang |
| 5,332,892 A | 7/1994 | Li et al. |
| 5,378,883 A | 1/1995 | Batterman et al. |
| 5,412,197 A | 5/1995 | Smith |
| 5,418,862 A | 5/1995 | Zheng et al. |
| 5,420,409 A | 5/1995 | Longacre, Jr. et al. |
| 5,428,212 A | 6/1995 | Tani et al. |
| 5,446,271 A | 8/1995 | Cherry et al. |
| 5,455,414 A | 10/1995 | Wang |
| 5,461,417 A | 10/1995 | White et al. |
| 5,463,214 A | 10/1995 | Longacre, Jr. et al. |
| 5,478,999 A | 12/1995 | Figarella et al. |
| 5,481,098 A | 1/1996 | Davis et al. |
| 5,486,689 A | 1/1996 | Ackley |
| 5,487,115 A | 1/1996 | Surka |
| 5,507,527 A | 4/1996 | Tomioka et al. |
| 5,510,603 A | 4/1996 | Hess et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre, Jr. et al. |
| 5,612,524 A | 3/1997 | Sant'Anselmo et al. |
| 5,627,358 A | 5/1997 | Roustaei |
| 5,635,699 A | 6/1997 | Cherry et al. |
| 5,646,391 A | 7/1997 | Forbes et al. |
| 5,657,402 A | 8/1997 | Bender et al. |
| 5,675,137 A | 10/1997 | van Haagen et al. |
| 5,682,030 A | 10/1997 | Kubon |
| 5,691,527 A | 11/1997 | Hara et al. |
| 5,723,853 A | 3/1998 | Longacre, Jr. et al. |
| 5,739,518 A | 4/1998 | Wang |
| 5,742,037 A | 4/1998 | Scola et al. |
| 5,744,790 A | 4/1998 | Li |
| 5,756,981 A | 5/1998 | Roustaei et al. |
| 5,767,497 A | 6/1998 | Lei |
| 5,767,498 A | 6/1998 | Heske, III et al. |
| 5,777,309 A | 7/1998 | Maltsev et al. |
| 5,780,834 A | 7/1998 | Havens et al. |
| 5,786,586 A | 7/1998 | Pidhirny et al. |
| 5,814,827 A | 9/1998 | Katz |
| 821,520 A | 10/1998 | Mulla et al. |
| 5,825,006 A | 10/1998 | Longacre, Jr. et al. |
| 5,852,288 A | 12/1998 | Nakazawa et al. |
| 5,872,354 A | 2/1999 | Hanson |
| 5,877,486 A | 3/1999 | Maltsev et al. |
| 5,880,451 A | 3/1999 | Smith et al. |
| 5,889,270 A | 3/1999 | van Haagen et al. |
| 5,902,988 A | 5/1999 | Durbin |
| 5,914,476 A | 6/1999 | Gerst, III et al. |
| 5,920,060 A | 7/1999 | Marom |
| 5,929,418 A * | 7/1999 | Ehrhart et al. ........... 235/462.27 |
| 5,932,862 A | 8/1999 | Hussey et al. |
| 5,936,224 A | 8/1999 | Shimizu et al. |
| 5,949,052 A | 9/1999 | Longacre, Jr. et al. |
| 5,992,744 A | 11/1999 | Smith et al. |
| 6,000,612 A | 12/1999 | Xu |
| 6,006,990 A | 12/1999 | Ye et al. |
| 6,021,946 A | 2/2000 | Hippenmeyer et al. |
| 6,053,407 A | 4/2000 | Wang et al. |
| 6,056,198 A | 5/2000 | Rudeen et al. |
| 6,075,883 A | 6/2000 | Stern et al. |
| 6,075,905 A | 6/2000 | Herman et al. |
| 6,078,251 A * | 6/2000 | Landt et al. ............... 340/10.41 |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,141,033 A | 10/2000 | Michael et al. |
| 6,152,371 A | 11/2000 | Schwartz et al. |
| 6,158,661 A | 12/2000 | Chadima, Jr. et al. |
| 6,161,760 A | 12/2000 | Marrs |
| 6,176,428 B1 | 1/2001 | Joseph et al. |
| 6,189,792 B1 | 2/2001 | Heske, III |
| 6,206,289 B1 | 3/2001 | Sharpe et al. |
| 6,209,789 B1 | 4/2001 | Amundsen et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,289,113 B1 | 9/2001 | McHugh et al. |
| 6,298,176 B2 * | 10/2001 | Longacre et al. ............. 382/313 |
| 6,334,060 B1 | 12/2001 | Sham et al. |
| 6,340,119 B2 | 1/2002 | He et al. |
| 6,371,373 B1 | 4/2002 | Ma et al. |
| 6,398,113 B1 | 6/2002 | Heske, III |
| 6,405,925 B2 | 6/2002 | He et al. |
| 6,408,429 B1 | 6/2002 | Marrion et al. |
| 6,446,868 B1 | 9/2002 | Brent et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,512,714 B2 | 1/2003 | Hanzawa et al. |
| 6,513,714 B1 | 2/2003 | Davis et al. |
| 6,513,715 B2 | 2/2003 | Heske, III |
| 6,561,427 B2 | 5/2003 | Sham et al. |
| 6,629,642 B1 | 10/2003 | Swartz et al. |
| 6,677,852 B1 | 1/2004 | Landt |
| 6,681,151 B1 | 1/2004 | Weinzimmer et al. |
| 6,698,656 B2 | 3/2004 | Parker et al. |
| 6,728,419 B1 | 4/2004 | Young |
| 6,761,316 B2 | 7/2004 | Bridgelall |
| 6,816,063 B2 | 11/2004 | Kubler |
| 6,913,199 B2 | 7/2005 | He |
| 6,919,793 B2 | 7/2005 | Heinrich |
| 7,044,378 B2 | 5/2006 | Patel |
| 7,059,525 B2 | 6/2006 | Longacre, Jr. et al. |
| 7,061,524 B2 | 6/2006 | Liu et al. |
| 7,066,388 B2 | 6/2006 | He |
| 7,070,099 B2 | 7/2006 | Patel |
| 7,121,467 B2 | 10/2006 | Winter |
| 7,175,090 B2 | 2/2007 | Nadabar |
| 7,181,066 B1 | 2/2007 | Wagman |
| 7,219,841 B2 | 5/2007 | Biss |
| 7,604,174 B2 | 10/2009 | Gerst et al. |
| 2001/0042065 A1 | 11/2001 | Yoshihiro et al. |
| 2001/0042789 A1 | 11/2001 | Krichever et al. |
| 2002/0044689 A1 | 4/2002 | Roustaei et al. |
| 2002/0171745 A1 | 11/2002 | Ehrhart |
| 2003/0062418 A1 | 4/2003 | Barber et al. |
| 2003/0090586 A1 | 5/2003 | Jan et al. |
| 2003/0117511 A1 | 6/2003 | Belz et al. |
| 2003/0121978 A1 | 7/2003 | Rubin et al. |
| 2003/0195749 A1 | 10/2003 | Schuller |
| 2003/0201328 A1 | 10/2003 | Jam et al. |
| 2004/0026508 A1 | 2/2004 | Nakajima et al. |
| 2004/0091255 A1 | 5/2004 | Chase et al. |
| 2005/0180804 A1 | 8/2005 | Andrew et al. |
| 2005/0263599 A1 | 12/2005 | Zhu et al. |
| 2005/0275831 A1 | 12/2005 | Silver |
| 2005/0275897 A1 | 12/2005 | Fan et al. |
| 2006/0022052 A1 | 2/2006 | Patel et al. |
| 2006/0027657 A1 | 2/2006 | Ninnink et al. |
| 2006/0027661 A1 | 2/2006 | Hosoi et al. |
| 2006/0050961 A1 | 3/2006 | Thiyagarajah |
| 2006/0131418 A1 | 6/2006 | Testa |
| 2006/0131419 A1 | 6/2006 | Nunnink |
| 2006/0132787 A1 | 6/2006 | Mestha et al. |
| 2006/0133757 A1 | 6/2006 | Nunnink |
| 2006/0249581 A1 | 11/2006 | Smith et al. |
| 2006/0283952 A1 | 12/2006 | Wang |
| 2006/0285135 A1 | 12/2006 | Mestha et al. |
| 2007/0181692 A1 | 8/2007 | Barkan et al. |

| | | | |
|---|---|---|---|
| 2008/0004822 | A1 | 1/2008 | Nadabar et al. |
| 2008/0011855 | A1 | 1/2008 | Nadabar |
| 2008/0019615 | A1 | 1/2008 | Schnee et al. |
| 2008/0143838 | A1 | 6/2008 | Nadabar |
| 2009/0090781 | A1 | 4/2009 | Ye et al. |
| 2009/0121027 | A1 | 5/2009 | Nadabar |

FOREIGN PATENT DOCUMENTS

| | | |
|---|---|---|
| EP | 0571892 | 12/1993 |
| EP | 0896290 | 10/2004 |
| EP | 1469420 | 10/2004 |
| EP | 1975849 | 1/2008 |
| WO | 02075637 | 9/2002 |
| WO | 03102859 | 12/2003 |
| WO | 2006052884 | 5/2006 |
| WO | 2008118419 | 10/2008 |
| WO | 2008118425 | 10/2008 |

OTHER PUBLICATIONS

Taniguchi, R-I, et al., A Distributed-Memory Multi-Thread Multiprocessor Architecture for Computer Vision and Image Processing: Optimized Version of AMP, 151-160, Jan. 1993.

Wittenburg, J.P., et al., A Multithreaded Architecture Approach to Parallel DSP's for High Performance Image Processing Applications, Signal Processing Systems, Piscataway, NJ, 241-250, Jan. 1999.

Cognex Technology and Investment, International Preliminary Report on Patentability Chapter I (IB/373), PCT/US2007/073575, Jan. 20, 2009.

Cognex Technology and Investment, Written Opinion of the International Search Authority, PCT/US2007/073575, Jan. 17, 2009.

* cited by examiner

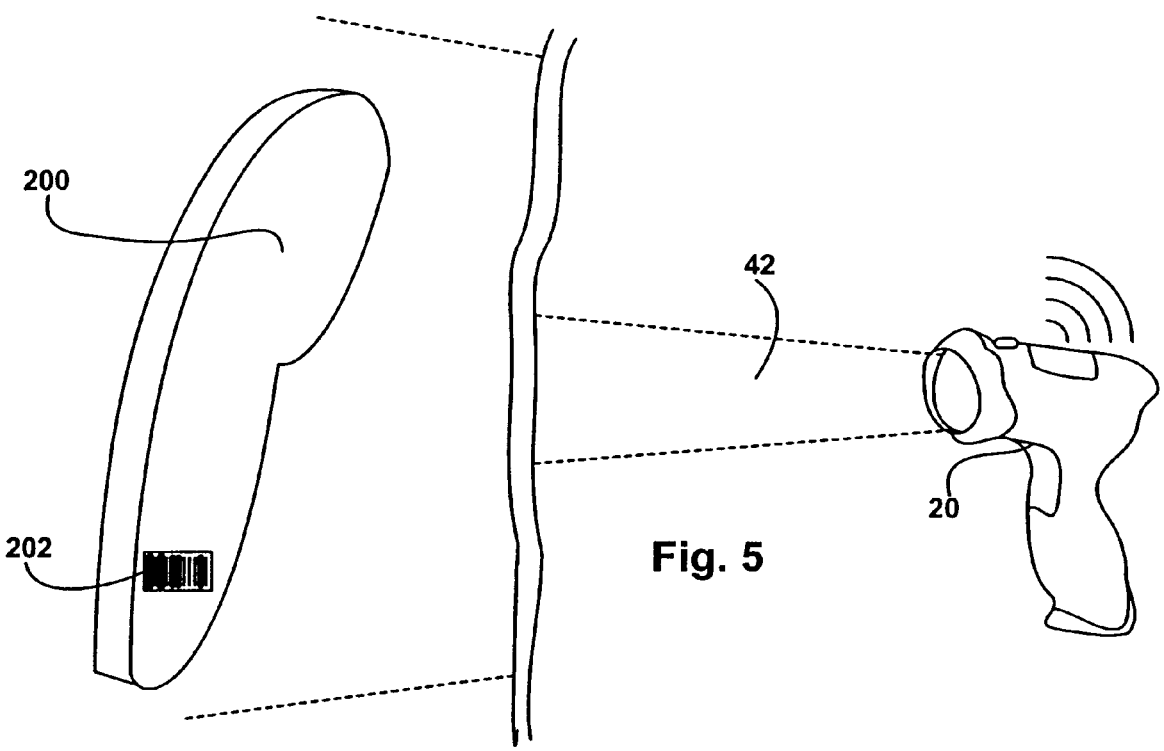
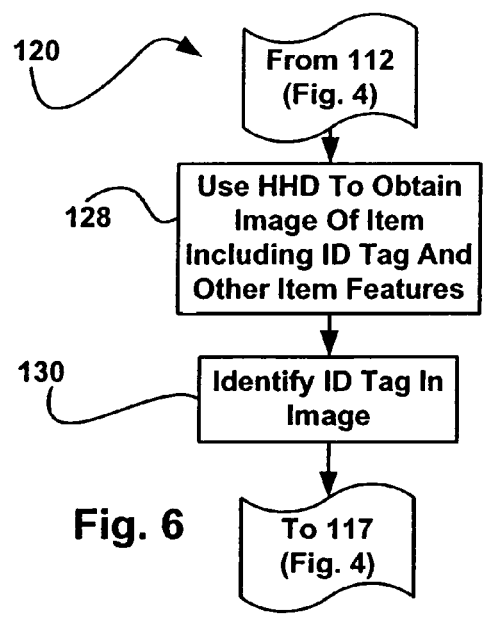
Fig. 5
Fig. 6

US 7,963,448 B2

HAND HELD MACHINE VISION METHOD AND APPARATUS

CROSS-REFERENCE TO RELATED APPLICATIONS

This patent is a continuation-in-part of U.S. patent application Ser. No. 11/020,640 which was filed on Dec. 22, 2004 now abandoned and which has the same title.

STATEMENT REGARDING FEDERALLY SPONSORED RESEARCH OR DEVELOPMENT

Not applicable.

BACKGROUND OF THE INVENTION

The present invention relates to machine vision and more specifically to portable machine vision systems for collecting images of items or groups of items, identifying the item(s) and performing one or more secondary functions using the collected images.

When assembly lines were first configured to increase the rate of manufacturing processes, often the results of processes had to be measured by hand to ensure high quality products. For instance, where two parts had to be between two and 2⅛th inch apart, a line worker had to use some type of mechanical hand held measuring device to manually measure the distance between the two parts and confirm that the distance was within the required range. Similarly, where a bottle was to be filled to a specific height with detergent prior to shipping, a line worker would have to manually examine the bottle to ensure that the detergent level was within a required range. While manual inspection and measurement can have good results when performed correctly, in many cases such procedures were prone to error, were mundane for the persons performing the procedures, were relatively expensive and time consuming to implement and could only be performed on a random basis (i.e., on every 100th product that passed along the line).

More recently, camera or machine vision systems have been developed that eliminate many of the problems associated with manual inspection procedures. For instance, in one application a camera and a light source may be rigidly mounted adjacent a station along a manufacturing transfer line including clamps that, when a semi-finished product is moved to the station, clamp the product in a precise juxtaposition (i.e., at a precise distance from and along a precise trajectory to) with respect to the camera and light source. Here, the camera and light source may be positioned twelve inches from and normal to a space between first and second product components such that an image of the clamped product generated by the camera shows the first and second components separated by the space having a space dimension. In this case, the image may be provided to a processor for identifying the space dimension and for comparing the identified dimension to a required space dimension between the first and second components.

To determine the space dimension in the image, the processor is programmed to scale the space defined by the first and second components in the image appropriately assuming the precise juxtaposition of the camera to the components (i.e., assuming a normal camera trajectory and twelve inches between the camera and the space). Where the identified dimension is different than an expected and required dimension the processor may be programmed to reject the part, to store the difference, to indicate the difference, to suggest a correction to eliminate the difference, etc.

Other imaging applications in addition to dimension determination include color verification, defect detection, object/pattern verification, object recognition, assembly verification and archival processes for storing images and/or other correlated information (e.g., the results of color verification processes, defect detection processes, etc.). In each of the applications listed above, camera images are processed in a different fashion to facilitate different functions but the precise juxtaposition restrictions required to generate meaningful/useful images still exist.

Systems like the one described above work well in the context of mechanical components that ensure specific relative juxtapositions of a camera, a light source and a product or product feature being imaged. Hereinafter systems that rigidly mount cameras and light sources in specific positions with respect to other components that restrict product position during imaging will be referred to as "constrained vision systems".

Unfortunately, there are a huge number of manufacturing and other applications where constrained vision systems are not easily employed but where the advantages of machine vision described above (i.e., accuracy, speed, low cost, consistency, etc.) would be useful. For instance, in the case of jet engine manufacturing, engines are typically assembled in relatively small numbers at assembly stations. Here, an engine often includes a large number of different components and the dimensions and spacings between many of the components must be precise in order for the engine to operate properly. Measurement of each of the required dimensions and spacings would require an excessive number of stationary cameras and light sources and would therefore be too costly for most applications. In addition, even if costs associated with required stationary cameras and sources were not an issue, placement of the cameras and sources adjacent the assembly station and at proper positions for obtaining required images would be impossible given the fact that assembly personnel need to move freely within the assembly station space during the assembly process.

Moreover, in many applications the product (e.g., a jet engine) being assembled may be mounted for rotation about one or more axis so that assembly personnel can manipulate the product easily to obtain different optimal vantage points for installing components. Here, where product position is alterable, even if a stationary camera were provided adjacent an assembly station, precise positioning of the camera with respect to the product would be difficult to achieve as the product is moved to optimize position for installation purposes. Where camera position with respect to the product/feature being imaged is unknown or is inaccurately assumed, resulting images can be mis-scaled such that comparison to required ranges is inappropriate. For instance, assume that a required distance between two features must be within a range of five and 5⅛th inches and a machine vision system assumes that a camera is twelve inches from and normal to a space between the two features when an image is obtained. In this case, when an image is obtained, the system may be programmed to identify the two features and measures the dimension there between. Thereafter, the system scales the measured dimension assuming the image was taken from twelve inches and at an angle normal to the space between the two features. In this case, if a camera used to obtain an image is at an angle (e.g., 15 degrees) with respect to normal and/or is fifteen inches from the space as opposed to twelve inches, the dimension calculated by the system will be different than the actual dimension and an error will likely be indicated even if the actual dimension is within the required range.

Another exemplary application where constrained vision systems are not easily employed but where the advantages of machine vision described above would be useful is in small manufacturing plants. For instance, in a small metal working facility there may be 1000 different measurements that routinely need to be taken on various products. Here, while at least some of the 1000 measurements may need to be made hundreds of times each year, the volume of product associated with even the most routine measurements may not justify the costs associated with even a single stationary machine vision system. In these cases the advantages of machine vision are typically foregone and all measurements end up being manual.

Thus, it would be advantageous to have a system and methods whereby the advantages of machine vision systems could be employed in many applications in which such advantages have heretofore been foregone for various reasons and where costs associated therewith can be reduced appreciably. More specifically, it would be advantageous to have a system and methods whereby one camera and light assembly could be used to obtain many different product/feature images of one or a plurality of products and where the system could automatically identify product types, image types and specific features associated with image and product types and could then perform product and image specific applications or supplemental processes. Furthermore, it would be advantageous to have a system and methods that provide guidance to a system operator for generally optimally positioning a camera/light source with respect to products and features for obtaining suitable images for processing.

BRIEF SUMMARY OF THE INVENTION

It has been recognized that many of the advantages associated with machine vision in the context of constrained vision systems above can be extended to other applications by providing a camera and light source on a hand held portable device (hereinafter an "HHD"). Here, the HHD can be positioned in any relative juxtaposition with respect to a product or product feature to obtain images thereof for analysis by system software. Where many different product characteristics need to be imaged for examination purposes, the camera can be positioned in several different positions to obtain the images. In at least some cases system software can be programmed to recognize an obtained image as similar to a specific one of a plurality of optimal stored images that includes specific features of interest so that, when the image is obtained, the system can automatically perform different processes on the image information.

In at least some cases the HHD may include a guidance mechanism for helping a user position the HHD with respect to a product or feature for obtaining an image suitable for specific processes. In some cases guidance may be provided by simply transmitting a specific light pattern toward a product to show the field of camera view. In other cases the guidance may be "active" and include indications that direct an HHD user to move the HHD in specific directions relative to the product or feature being imaged. Where active guidance is provided, the HHD may have access to optimal product images stored in a database. Here, the HHD may obtain an image, compare the image to one or more of the optimal images to identify positional changes that would result in a more optimal positioning of the HHD and then provide guidance to move left, move right, move up, move down, move forward, move backward, adjust pitch, adjust roll, etc.

Where the HHD is to be used to obtain images of two or more different product types, an identification tag (e.g., bar code, RFID tag, etc.) may be placed on each of the products with information useable to identify the product and the HHD may also be equipped with a tag reader for obtaining information form the tags. In this case, prior to or after obtaining an image of a product, the HHD may be used to obtain information from the tag so that the product type can be determined. The HHD may be programmed to perform different functions for each different product type. For instance, for a first product type the HHD may be programmed to guide the HHD user to obtain two different images that are similar to optimal stored images and to perform various measurements of features in the images while, for a second product type the HHD may be programmed to guide the HHD user to obtain five different images from various orientations and to perform various measurements of features in the five images. After the tag information is obtained the HHD can perform product type specific processes and provide product type specific instructions.

Consistent with the above comments, at least some embodiments of the present invention include a method for use with a portable device including a processor, the method comprising the steps of providing an identification tag on at least one item that includes item identifying information, obtaining item identifying information from the identification tag via the portable device, obtaining at least one image of the at least one item via the portable device and performing a supplemental process using the identifying information and the at least one image.

In addition, some embodiments of the invention include a method for use with a database and a portable device including a processor, the method comprising the steps of (a) storing information in the database regarding at least one optimal relative juxtaposition of the portable device with respect to a first item type to be imaged, (b) positioning the portable device proximate an instance of the first item, (c) obtaining at least one intermediate image of the first item instance; an (d) providing guidance information indicating relative movement of the portable device with respect to the first item instance to move the portable device toward the at least one optimal relative juxtaposition with respect to the first item instance.

Here, in some cases the method may further include the step of, prior to step (d), examining the intermediate image to identify position of the portable device with respect to the first item instance, the step of providing guidance including providing guidance as a function of the intermediate image examination. Steps (b) through (d) may be repeated until the portable device is at least substantially in the at least one optimal relative juxtaposition with respect to the first item instance.

At least some embodiments of the invention include a method for use with a database and a portable device including a processor, the method for obtaining information associated with a subset of a plurality of different item types, the method comprising the steps of providing an identification tag on at least one item that includes item identifying information, obtaining item identifying information from the identification tag via the portable device, identifying the item type from the item identifying information, obtaining at least one image of the at least one item via the portable device, identifying at least one supplemental process to be performed on the obtained image wherein the supplemental subprocess is identified at least in part as a function of the item type and performing the at least one supplemental process on the obtained image.

In addition, according to some inventive aspects, some embodiments include a method for use with a database and a portable device including a processor, the method for performing functions associated with different items, the method comprising the steps of providing identification tags on each of a plurality of items, each tag including identifying information useable to specifically identify an associated item, obtaining item identifying information from at least one identification tag corresponding to a specific item via the portable device, obtaining other information associated with the specific item including at least one image of the specific item via the portable device, performing supplemental processes on the other information associated with the specific item, monitoring the portable device for a transition indication and, when a transition indication is received, halting the supplemental processes.

Some embodiments include a system for use with items that include identification tags where each tag includes item identifying information, the apparatus comprising a portable housing. a processor mounted within the housing, a tag information obtainer supported by the housing for obtaining information from the tags and a camera supported by the housing, wherein, the processor runs a program to, when information is obtained from a tag via the obtainer and an image is obtained via the camera, perform a supplemental process on the image as a function of the information obtained from the tag.

Moreover, some embodiments of the invention include an apparatus for use with items that include identification tags where each tag includes item identifying information, the apparatus comprising a portable housing, a processor mounted within the housing, a tag information obtainer supported by the housing for obtaining information from the tags and a camera supported by the housing, wherein, the processor runs a program to, when information is obtained from a tag associated with a specific item via the obtainer, perform supplemental processes associated with the specific item on images obtained by the camera until a transition indication is received and, when a transition indication is received, halting the supplemental processes associated with the specific item.

Furthermore, some embodiments include a method for use with a portable device including a processor, the method comprising the steps of identifying at least one item using the portable device, obtaining at least one image of the at least one item via the portable device and performing a supplemental process on the at least one image as a function of the identity of the item.

According to one aspect the invention includes a method for marking a product for use with a camera including a field of view, the method comprising the steps of providing an identification tag on the product wherein the tag is machine readable to obtain information associated with the product and providing a source mark on the product spatially proximate the tag such that both the tag and the source mark can be simultaneously located within the camera field of view.

In addition, some embodiments include a method for use with a portable device including a processor, the method comprising the steps of associating an identification tag with at least one item that includes item identifying information, obtaining item identifying information from the identification tag via the portable device, obtaining at least one image of the at least one item via the portable device and performing a supplemental process using the identifying information and the at least one image. Here, the step of associating may include providing the identification tag on the item or providing the tag in a booklet along with human distinguishable information associated with the item.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 5 is a perspective view of a handheld device like the one illustrating in FIG. 1 being used to obtain an image of an item for performing any of several different supplemental processes according to various aspects of the present invention;

FIG. 6 is a flow chart illustrating a subprocess that may be substituted for a portion of the method of FIG. 4;

DETAILED DESCRIPTION OF THE INVENTION

Figure 1:
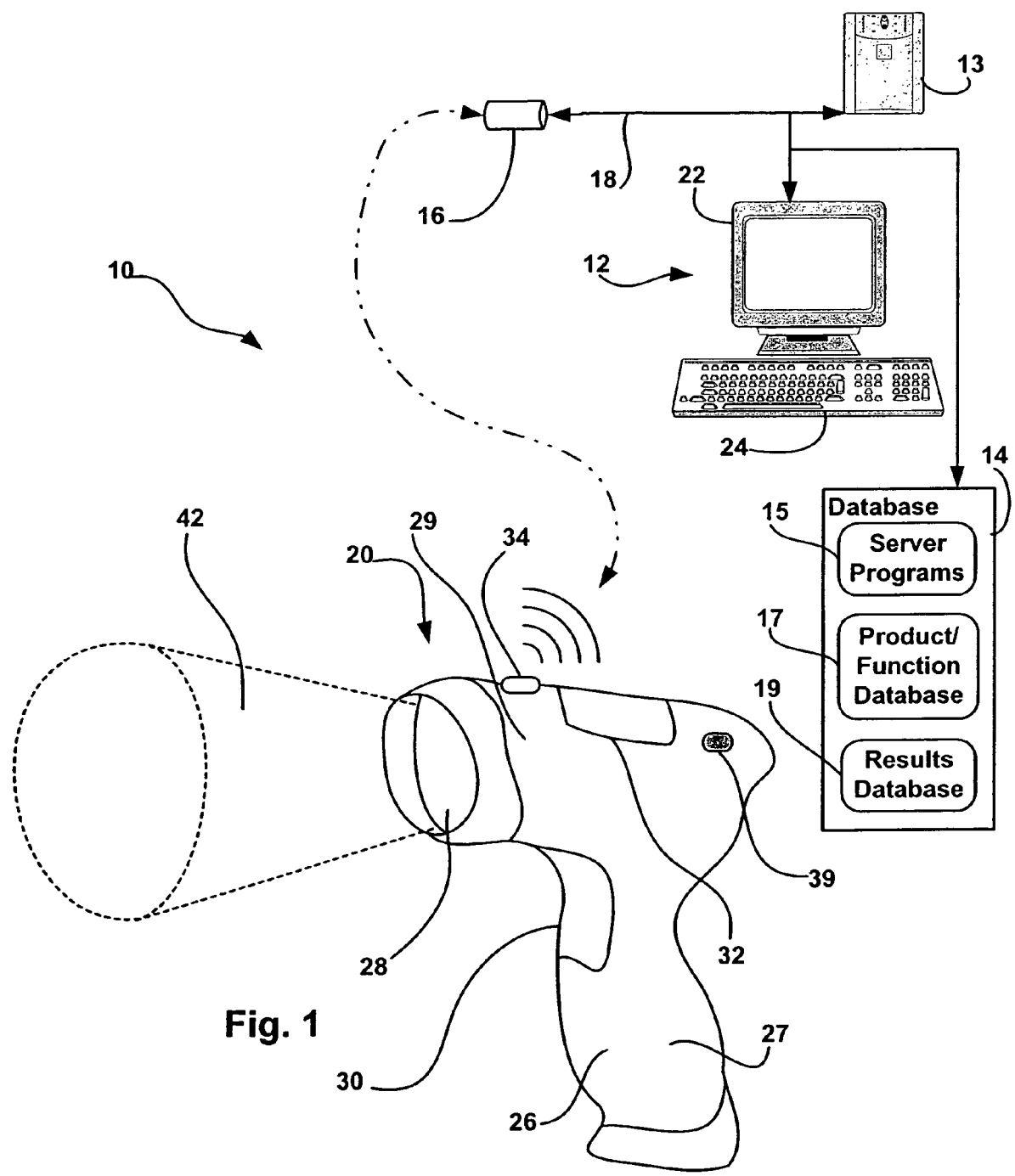
FIG. 1 is a schematic view of an exemplary system including a handheld portable identification tag reader and camera device according to at least some aspects of the present invention.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals correspond to similar elements throughout the several views and, more specifically, referring to FIG. 1, the present invention will be described in the context of an exemplary information system 10 including a work station 12, a server 13, a database 14, a wireless access point 16 and a handheld portable devices (HHD) 20. Work station 12 is linked to server 13 for two-way communication via a network generally identified by numeral 18. In addition, server 13 is linked via network 18 to access point 16 as well as to database 14 for two-way communication therewith. Server 13 runs programs 15 stored in database 14 to perform varius methods according to the present invention which will be described hereinafter.

In addition to storing programs 15 run by server 13, database 14 also stores information in a product/function database 17 corresponding to items or products for which some process or method may be performed by system 10. In addition, in at least some embodiments of the present invention, database 14 also stores results or at least a subset of the results in a results database 19 that occur after programs 15 have been performed.

In at least some embodiments of the present invention, interface 12 includes a display screen 22 and some type input device such as keyboard 24. Other types of input devices are contemplated including a mouse, a track ball, voice recognition hardware, etc. Using work station 12, a system operator can perform various tasks, depending upon the method being performed by server 13, to facilitate method steps to be described hereinafter.

Access point 16, as well known in the art, is a wireless transceiver that is capable of receiving wireless signals (e.g., 802.11b, blue tooth, etc.) and transmitting similarly coded wireless information within the area surrounding access point 16. When access point 16 receives information, the information is decoded and transmitted to server 13 via network 18. Similarly, server 13 can transmit information wirelessly within the space surrounding access point 16 by transmitting the information first via network 18 to access point 16 and causing access point 16 to transmit the information within the surrounding area.

Figure 2:
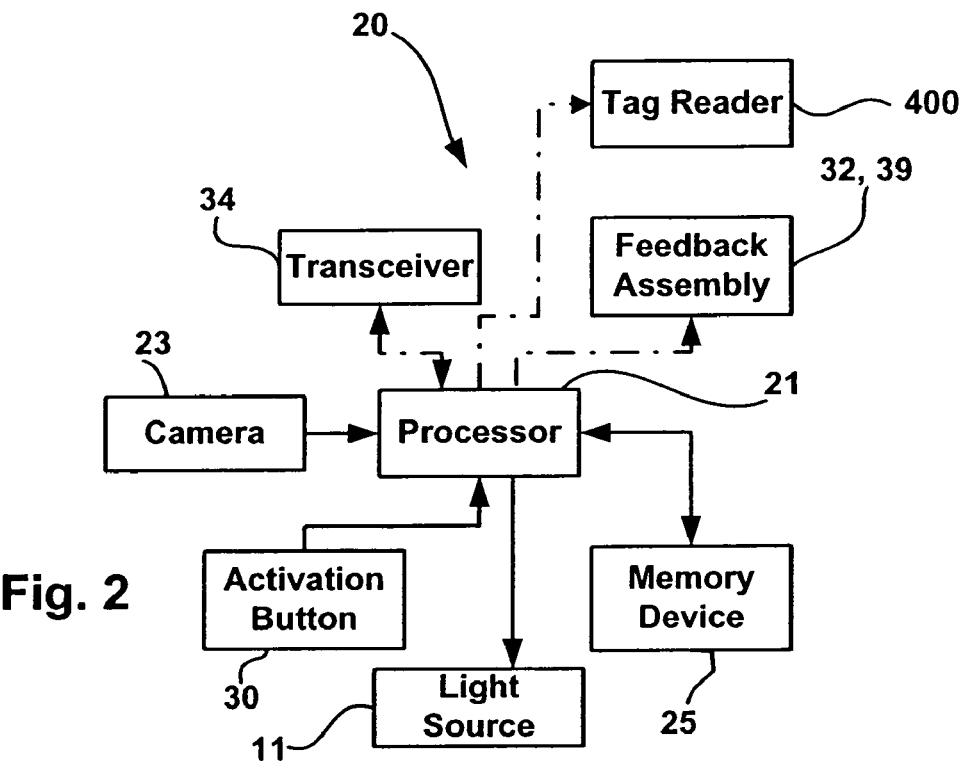
FIG. 2 is a schematic diagram illustrating some of the components that form the handheld device of FIG. 1.

Referring still to FIG. 1 and also to FIG. 2, HHD 20 includes a housing 26 having a pistol type shape and includes a grip shaped handle 27 for easy gripping via a user's hand and a barrel 29 that extends away from a user when handle 27 is gripped. An activation button in the form of a trigger 30 is provided on handle 27 where a users index finger resides during normal use. Within housing 26 a plurality of components are mounted including, among other things, a processor 21, a camera 23, an HHD memory device 25, a light source 11 and a camera lens 28. In at least some embodiments HHD 20 also includes a separate tag reader 400, some type of feedback device 32, 39, and/or a transceiver 34, shown linked to processor 21 via phantom lines to indicate that at least some embodiments do not include these or a subset of these components. Processor 21 is linked for two-way communication to memory device 25 for storing programs and information therein and retrieving program code and stored information when required. In addition, where HHD includes a transceiver 34, processor 21 is linked for two-way communication to transceiver 34 so that processor 21 can communicate with server 13 via access point 16 and network 18 to receive information therefrom and provide information thereto.

Referring still to FIG. 2, processor 21 is linked to activation button/trigger 30 for receiving activation signals therefrom. Processor 21 is linked to light source 11 for controlling activation thereof. In at least some cases source 11 will include two or more white light LEDs that shine light through lens 28 (see again FIG. 1) when trigger 30 is activated to illuminate a space in front of lens 28. In some cases when trigger 30 is activated the LEDs generate a short flash of light. In some cases it is contemplated that the light source 11 may be capable of generating continuous light over a longer duration (e.g., 20 seconds). Processor 21 is also linked to camera/sensor 23 for receiving images generated thereby.

Referring still to FIG. 1, camera lens 28 is at the front end of barrel 29 and has a field of view identified by numeral 42. In the embodiment illustrated in FIG. 1, transceiver 34 is mounted near the top end of barrel 29 to facilitate relatively unobstructed communication with access point 16. Feedback configuration 32, 39 (39 is a speaker) is mounted on the top surface of barrel 29 to facilitate feedback to an HHD operator.

Figure 3:
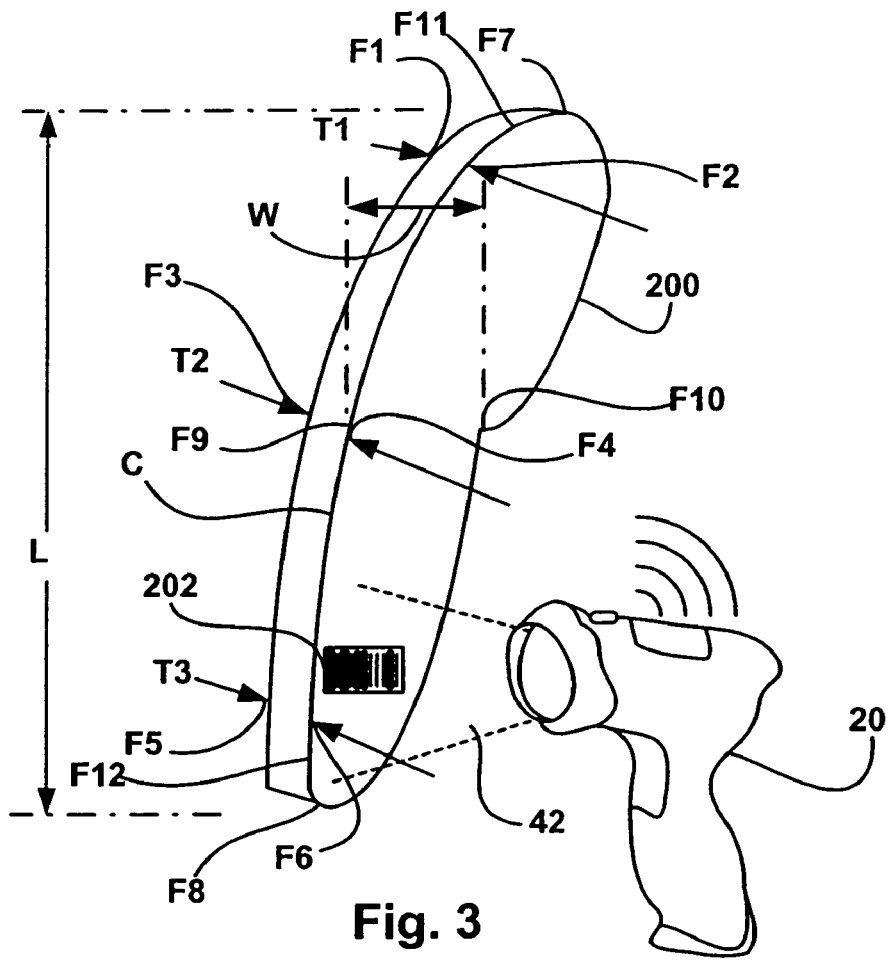
FIG. 3 is a perspective view of the handheld device of FIG. 1 being used to obtain information from an identification tag according to at least some aspects of the present invention.

Referring to FIG. 3, an exemplary product, a jet engine rotor blade 200, is illustrated where the blade includes various features (e.g., edges) and feature characteristics (e.g., dimensions, curvatures, colors, etc.). For instance, blade 200 includes edges F1 through F12, top, middle and bottom thickness T1, T2 and T3 between edges F1 and F2, edges F3 and F4 and edges F5 and F6, respectively, a length dimension L between edges F7 and F8, a width dimension W between edges F9 and F10 and a curvature between edge portions F11 and F12. Hereinafter, while HHD 20 may be, and indeed is intended to be, used with many different product/item types in at least some applications, HHD operations will be described in the context of exemplary blade 200. In FIG. 3, an identification tag 202 is provided on blade 200 that includes a conventional bar code. Other identification tag types are contemplated including 2D bar codes, dot matrices, RFID tags, optical character recognition type tags, etc.

Figure 4:
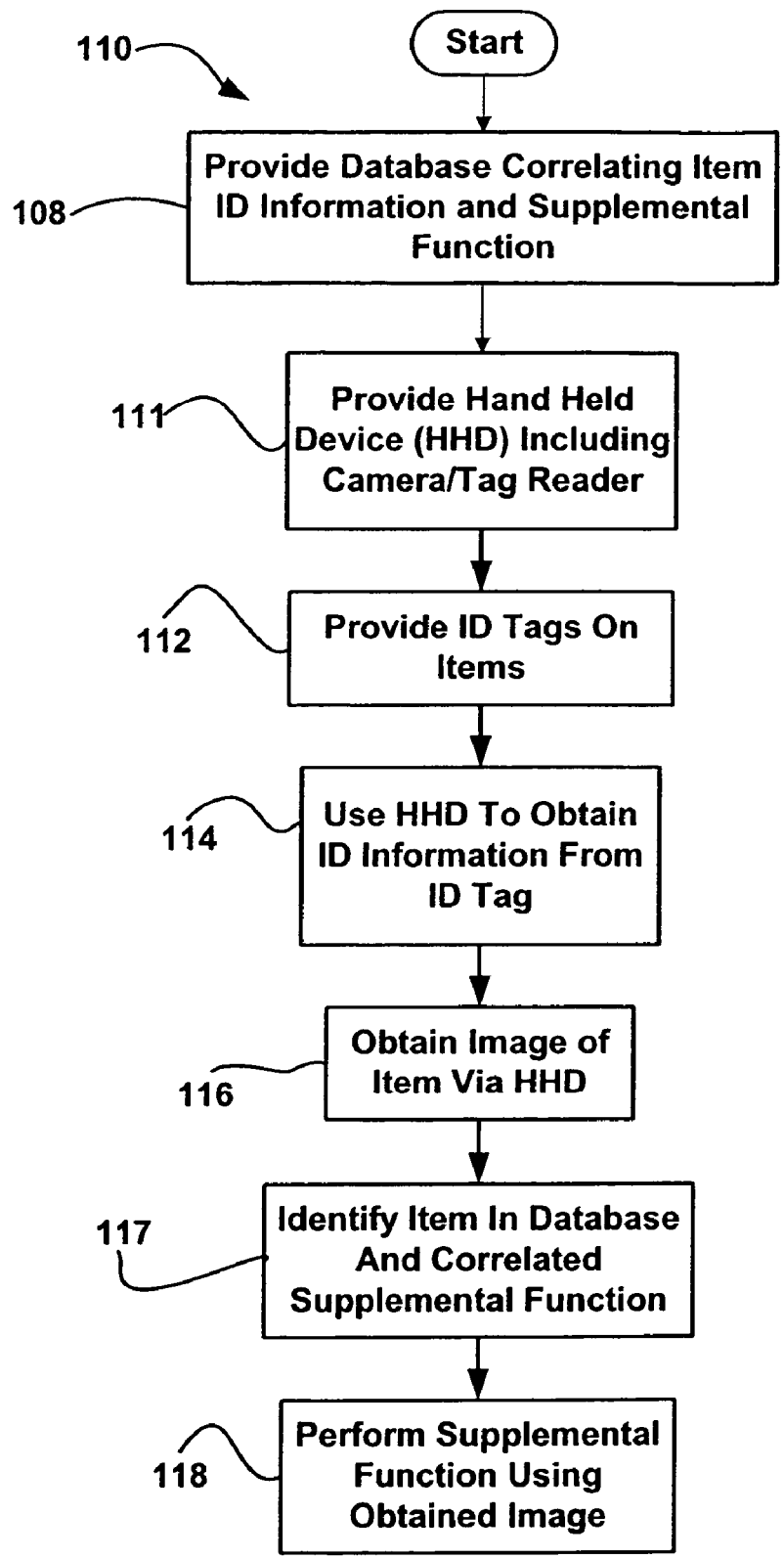
FIG. 4 is a flow chart illustrating an exemplary method according to the present invention.

Referring now to FIG. 4, an exemplary simplified and general method 110 according to at least some aspects of the present invention is shown. In the case of this first example, it is assumed that HHD 20 does not itself include a feedback configuration 32 and that, in fact, HHD 20 may be used independent of the other system components illustrated in FIG. 1. Referring also to FIGS. 1 and 2, at block 108, a database 17 is provided that correlates item identification information and supplemental item related functions.

At block 111, HHD 20 is provided that includes a camera/tag reader as described above. At block 112, identification tags are provided on items including blade 200 in FIG. 3 to be used with system 10. Continuing, at block 114, a system user uses HHD 20 to obtain identification information from one of the ID tags 202. At block 116, HHD 20 is used to obtain an image of the item associated with the most recently obtained tag information. For instance, referring once again to FIG. 3 and also to FIG. 5, where HHD 20 is used to obtain ID information from tag 202 at block 114 where tag 202 resides on blade 200, at block 116, HHD 20 is used to obtain an image of blade 200 (see FIG. 5). At block 117, HHD processor 21 identifies the item associated with tag 202 in database 17 and the correlated supplemental function(s). At block 118 processor 21 performs the supplemental function(s) using the obtained image. Thus, for instance, where the supplemental function is simply to store the obtained image with item identifying information, processor 21 may store the obtained image correlated with the identifying information in HHD memory 25.

According to other embodiments of the present invention, instead of requiring a system user to separately obtain an item image and identification information from a tag 202 or the like, a single image may be obtained which includes features of an item that are of interest as well as the tag information. For instance, referring once again to FIG. 5, in at least some cases HHD 20 may be useable to obtain a full image of blade 200 including information specified by tag 202. Here, after an item image has been obtained, processor 21 may be programmed to isolate the region of interest of the obtained image including the tag 202, read the tag information and then perform a supplemental process on the image as a whole that is associated with the identification tag information.

Consistent with the comments in the preceding paragraph, referring now to FIG. 6, an exemplary subprocess that may be substituted for a portion of the process of FIG. 4 is illustrated. Referring also to FIG. 4, after ID tags are provided on items to be used with system 10, HHD 20 may be used to obtain a image of an item where the image includes the ID tag on the item as well as other item features. Next, at block 130, HHD processor 21 identifies the ID tag (e.g., 202 in FIG. 6) in the image and reads the identification information thereon. After block 130, control passes back to block 117 in FIG. 4 where the process described above continues.

In addition to storing correlated images and item/product identifying information, other supplemental functions are contemplated that may be performed via HHD 20. For instance, in at least some cases, it is contemplated that HHD 20 may perform programs to analyze obtained images to identify regions of interest in the images, visually distinguishable product features within regions of interest and characteristics of those features. For example, referring again to FIG. 3, HHD 20 may be programmed to, when tag information indicates that an item associated therewith is a rotor blade 200, analyze the obtained image to identify top and bottom edges F7 and F8, respectively, measure the length dimension L between edges F7 and F8, and store the length dimension L correlated with the blade identifying information in HHD memory 25. Similarly, any of the other blade dimensions T1, T2, T3, W or C may be calculated and stored.

As another example, where optimal product dimensions have been specified in a database (e.g., in memory 25), HHD processor 21 may be programmed to, after item/product dimensions have been calculated, compare the calculated values to the optimal values and store results of the comparison in a correlated fashion with item identifying information in HHD memory 25.

Referring still to FIG. 1, where HHD 20 includes a transceiver 34, some or at least a portion of processing described above and hereinafter may be performed by server 13. For instance, tag identification information and images may be wirelessly transmitted from HHD 20 to server 13 via access point 16 and network 18 so that server 13 can perform the item/product identifying process, identify supplemental functions and perform supplemental functions.

Similarly, in at least some cases, HHD 20 may simply obtain tag identifying information and product images, correlate and store the identifying information and images and download the correlated information to server 13 in batch either wirelessly or via a hard wire connection (e.g., a USB port), additional supplemental processes being performed thereafter via server 13.

Where work station 12 or at least display 22 is proximate the location of blade 200 during the imaging process and server 13 performs at least parts of the supplemental processes, server 13 may provide at least a subset of the process results to an HHD user via display 22. For instance, product images may be provided via display 22 as well as product identifying information (e.g., "rotor blade type 00-0001"). As another instance, where product features and characteristics are calculated from an image, the calculated values may be provided via display 22 either in a list form or, where an obtained image is generated, as markings on the generated image. As still one other instance, where calculated values are different than expected or optimal values, the differences may be indicated via display 22 in some fashion. Moreover, where calculated values are within an expected or acceptable range, an affirmation of the values as acceptable may be provided via display 22. The above feedback functions may also be performed/facilitated via display 22 where HHD processor 21 performs most of the supplemental functions and then transmits results to the display via point 16 and network 18.

Figure 7:
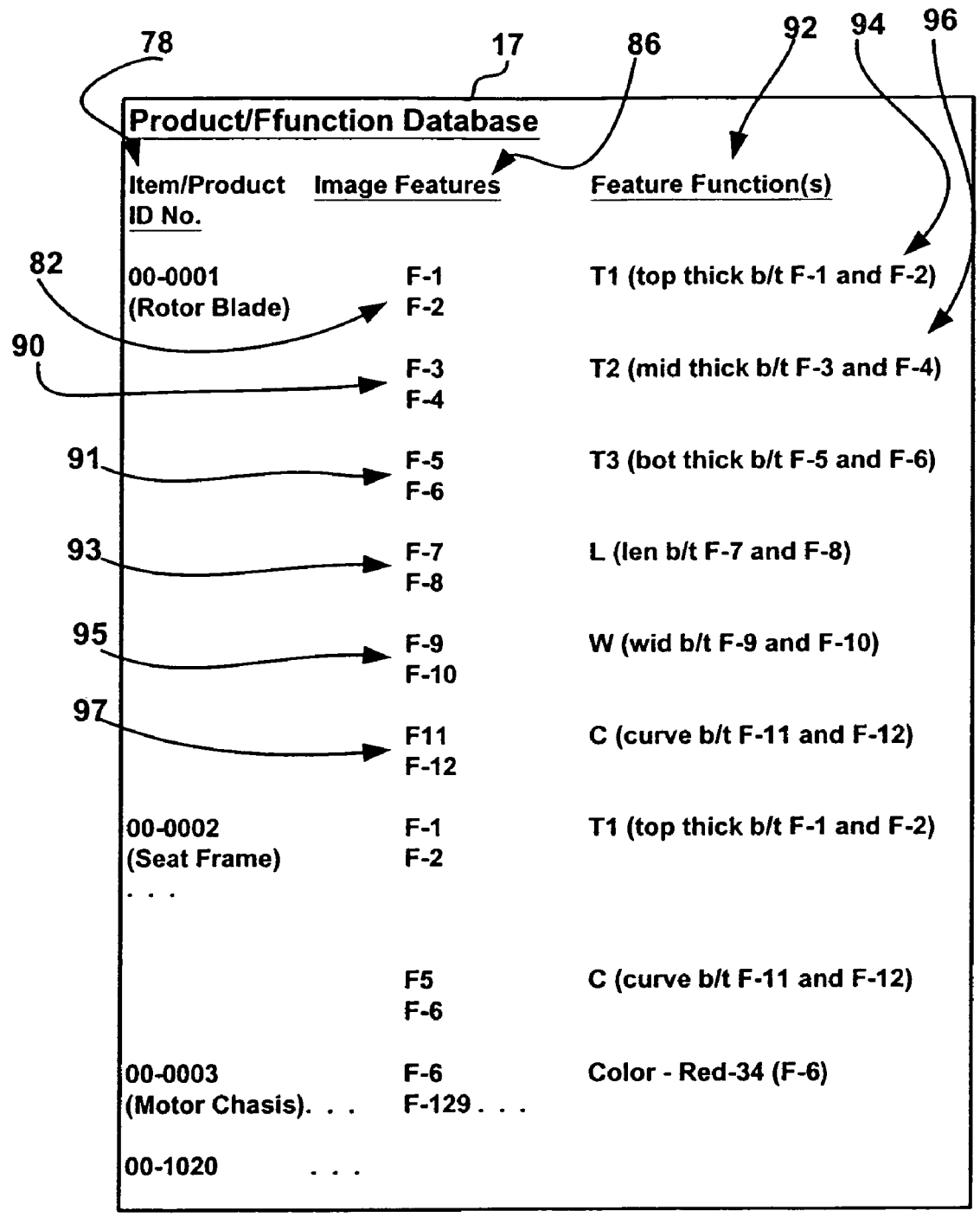
FIG. 7 is a an exemplary database according to at least some aspects of the present invention.

Referring now to FIG. 7, an exemplary, albeit simplified, product/function database 17 is illustrated that includes three separate columns, an item ID No. column 78, an image features column 86 and a feature function column 92. Item ID No. column 78 lists a separate identification number for each one of the items that may be used by system 10 in FIG. 1. For instance, in the present example where the rotor blade of FIG. 3 is an item for which supplemental processes may be performed, an identification number would be listed in column 78 for a rotor blade type. Hereinafter, unless indicated otherwise, it will be assumed that item number 00-0001 corresponds to rotor blade 200 as illustrated in FIG. 3. In the exemplary database 17, item numbers 00-0002 and 00-0003 correspond to a seat frame and a motor chassis, respectively.

Referring still to FIG. 7, image features column 86 lists at least one and, in many cases, a plurality of feature subsets (each subset including at least one feature) for each one of the identification numbers in column 78. For instance, column 86 lists six feature subsets 82, 90, 91, 93, 95 and 97 for product ID number 00-0001 in column 78. The feature subsets 82, 90, 91, 93, 95 and 97 corresponding to image ID number 00-0001 include features F1 and F2, features F3 and F4, features F5 and F6, features F7 and F8, features F9 and F10 and features F11 and F12 which correspond to different edges of rotor blade 200 as illustrated in FIG. 3. Here, in addition to identifying features of interest that should be visually discernable within images to be obtained, it is contemplated that instructions for either processor 21 or server 13 will also be specified in column 86 or elsewhere that indicate how the features should be identified in obtained images. For instance, referring again to FIGS. 3, 5 and 7, instructions for identifying top and bottom edges F7 and F8 may simply cause processor 21 or server 13 to identify the most distal edges within an obtained image or to identify the length dimension generally as the long dimension of the product and then identify the edges that define the length.

Here it is contemplated that the instructions for identifying features would be provided or specified during some type of commissioning procedure. For instance, in at least some cases an HHD 20 may be used to obtain an image of a product where the image includes the features (e.g., edges, curvatures, etc.) of interest. Next, the obtained image may be presented via display 22 and interface tools (e.g., a mouse, trackball, etc.) may be used to select image features such as edges. Here, software run by server 13 may help the user charged with commissioning to distinguish features. For instance, where a mouse controlled cursor is moved to edge F7 (see again FIG. 3), the software may identify the edge from differences in color in the image and highlight the border or edge F7 for selection via the mouse input device. Once a feature is selected in a commissioning image, the software may automatically identify a specific region of interest within the obtained image in which the feature resides and develop and store rules for identifying similar features in subsequent images.

Referring again to FIG. 7, feature function column 92 indicates a different function for each one of the feature subsets listed in column 86. For instance, a first function 94 indicates that a thickness T1 defined by the space between features F1 and F2 is to be measured. Similarly, characteristic 96 indicates that a middle thickness T2 between features F3 and F4 should be measured. The characteristics associated with feature subsets 91, 93, 95 and 97 indicate that a bottom thickness T3, a length L, a width W and a curvature C should be measured, respectively. In addition to indicating that specific dimensions should be identified, in at least some cases the feature function column will also indicate a desired value for a dimension or a desired value range and may instruct either the HHD processor 21 or server 13 to perform some additional function such as, for instance, storing measured values, comparing measured values to required values and indicating variances, comparing measured and required/expected values and indicating when measured values are within required ranges, etc.

Here again it is assumed that the feature functions are specified during a commissioning procedure. For instance, after features of interest have been identified and rules for identifying the features in obtained images have been developed and stored, server 13 may provide an interface for grouping image features into subsets (e.g., 82, 90, 91, etc) and for selecting associated feature functions. For example, referring again to FIGS. 3 and 7, after edge sections F1 and F2 are selected (e.g., subset 82), the commissioning software may provide function options including "Measure dimension and provide feedback via display", "Measure dimension and store", "Measure dimension, compare to range of acceptable dimensions and indicate differences", etc. When a feature function is selected in this example, it is contemplated that server 13 would populate an associated section of feature function column 92. Other commissioning procedures are contemplated.

Hereinafter, unless indicated otherwise, it will be assumed that HHD processor 21 performs most of the supplemental processes. Nevertheless, it should be appreciated that, in at least some cases, some or most of the process steps could also be performed by server 13 in communication with HHD 20 via access point 16.

Figure 8:
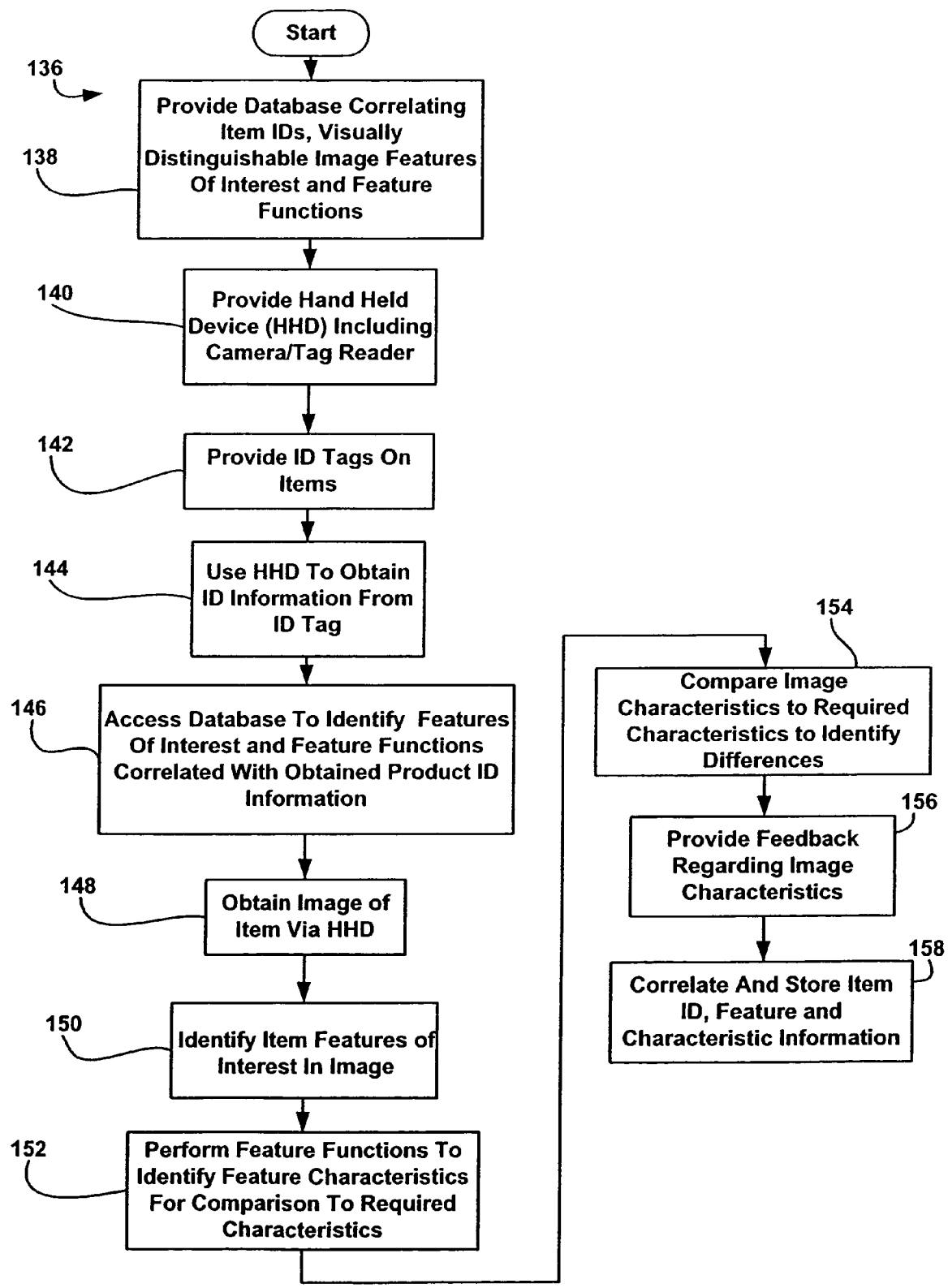
FIG. 8 is a flow chart illustrating another exemplary method according to at least some embodiments of the present invention.

Referring now to FIG. 8, an exemplary method 136 according to at least some aspects of the present invention is illustrated. Referring also to FIGS. 2, 3, and 7, at block 138, a database 17 is provided that correlates item IDs, visually distinguishable image features of interest to be identified in obtained images and feature function information. At block 140, an HHD 20 is provided that includes a camera/tag reader as described above. At block 142, ID tags are provided on items to be used with HHD 20. At block 144, HHD 20 is used to obtain ID information from an ID tag (e.g., 202, in FIG. 7). At block 146 HHD processor 21 accesses database 17 to identify features of interest and feature functions correlated with the obtained product identification information. At block 148, HHD 20 is used to obtain an image of the item from which the identification information was most recently obtained. At block 150, processor 21 identifies the item features of interest in the obtained image. At block 152, processor 21 ascertains feature characteristics for comparison to expected characteristics or to a range of expected characteristics. Consistent with the example above, processor 21 may attempt to identify any of thicknesses T1, T2 or T3, length L, width W or curvature C.

Continuing, at block 154, processor 21 compares image characteristics to required characteristics to identify any differences. At block 156, processor 21 provides feedback regarding feature characteristics. Here, in at least some embodiments, it is contemplated that to provide feedback, processor 21 transmits information via transceiver 34 to access point 16 and on to server 13 which provides feedback via display screen 22. In at least some cases, after block 156, either processor 21 or server 13 may be programmed to correlate and store item identification information, features and characteristic information including any differences between measured and required characteristics in the results database 19 (see again FIG. 1).

While the systems described above have several advantages, such systems also may have some short comings in the context of certain applications. For example, in general, the systems described above rely on the assumption that an HHD user will be extremely familiar with the products being imaged, the supplemental functions or processes being performed via the system and advantageous relative juxtapositions (e.g., angle, spacing, pitch of HHD, etc.) between the HHD and the products/features being imaged from which to obtain the images. Indeed, to obtain an image including features of interest for performing the supplemental functions, the HHD user would have to know which features are of interest and generally optimal angles and distances of the HHD to the product being imaged to ensure that suitable images are obtained for accurately identifying the features and feature characteristics. Here, while filtering and software compensation schemes may be used to compensate for minor differences between angles and distances of the camera to the features of interest, larger differences may not be accurately discernable and hence may not be able to be accurately compensated. Where an HHD user is not familiar with products, advantageous imaging juxtapositions and product features of interest however, the systems described above would be difficult to use at best.

To deal with the alignment problem described above, in at least some cases it is contemplated that system 10 may be programmed to help an HHD user position HHD 20 such that an image obtained thereby is optimal for performing other functions such as dimension measurement, color identification, and so on. To this end, referring to FIG. 9, in at lease some cases an expanded product/function database 17' may be provided that includes, in addition to ID number column 78, features column 86 and feature function column 92, an optimal images column 76. As illustrated, optimal images column 76 lists at least one and, in some cases, several optimal images, for each one of the item ID numbers listed in column 78. For instance, an image identifier 73 which is labeled "I-1 (30° front view)" is listed in column 76 for item identification number 00-0001 in column 78. As another instance, two separate image identifiers are listed in column 76 for item identification number 00-0002, twelve separate image identifiers are listed in column 76 for ID number 00-0003, and so on.

Here, it is assumed that an optimal image of a product has been captured during a commissioning procedure and stored in database 17 for each of the image identifiers listed in column 76. The idea here is that, when HHD 20 is used to obtain an image of a product, the obtained image can be compared to one or more optimal images to identify HHD movements required to move the HHD into an optimal juxtaposition with respect to the product being imaged or at least to identify if the HHD is within an acceptable range of optimal relative juxtapositions. In this case, an HHD position within an optimal range of relative juxtapositions will include a position wherein the characteristics that can be calculated from an image obtained from the position will be sufficiently accurate for the application associated with the characteristics. Here, sufficiency of accuracy is a matter of designer choice.

Feedback can be provided either via the HHD or some external device (e.g., display 22, see again FIG. 1) to help the HHD user reposition the HHD for obtaining a more optimal image for use in performing other supplemental functions. Here, it is assumed that a guidance program can be located in HHD memory device 25 that can compare obtained images to optimal images, identify differences and generate relatively simple guidance instructions usable by an HHD user to realign the HHD with an item being imaged. In addition, the guidance program can recognize when an obtained image is optimal or at least relatively optimal and can then use that image to perform other functions. For instance, exemplary simple guidance instructions may indicate that an HHD is aligned or misaligned with an item being imaged and may also indicate when an optimal image has been obtained. As another example, the HHD may be capable of indicating that the HHD should be moved up, down, left, right, forward and in reverse in addition to indicating whether or not the top of the HHD should be moved forward or backward or left or right to affect pitch and roll adjustments of the HHD. Other more complex and helpful active guidance systems are contemplated as described hereinafter.

Figure 9:
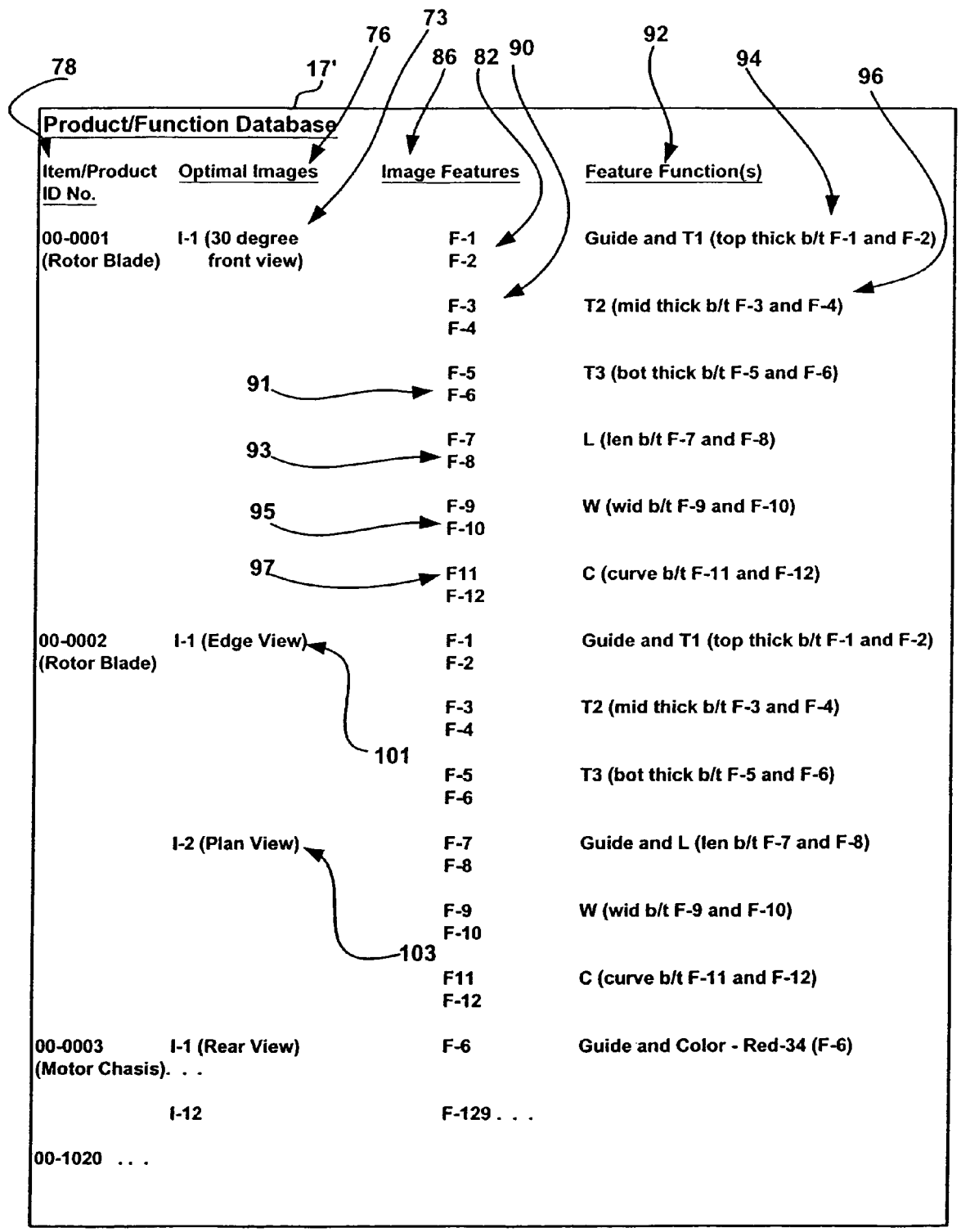
FIG. 9 is an exemplary database consistent with at least some aspects of the present invention.

Referring again to FIG. 9, as indicated above, in at least some cases more than one optimal image may be associated with a single product. For instance, an edge view image associated with identifier 101 and a plan view associated with identifier 103 are specified for a rotor blade having ID number 00-0002. Where two or more optimal images are associated with one product, it is contemplated that HHD 20 may be programmed to identify the optimal image most like an obtained image and provide guidance toward obtaining an image akin to the most similar optimal image. Here it is contemplated that the supplemental functions associated with each different optimal image would be different. For instance, as seen in FIG. 9, functions including calculating T1, T2 and T3 are associated with optimal image identifier 101 while functions including calculating L, W and C are associated with optimal image identifier 103.

Figure 10:
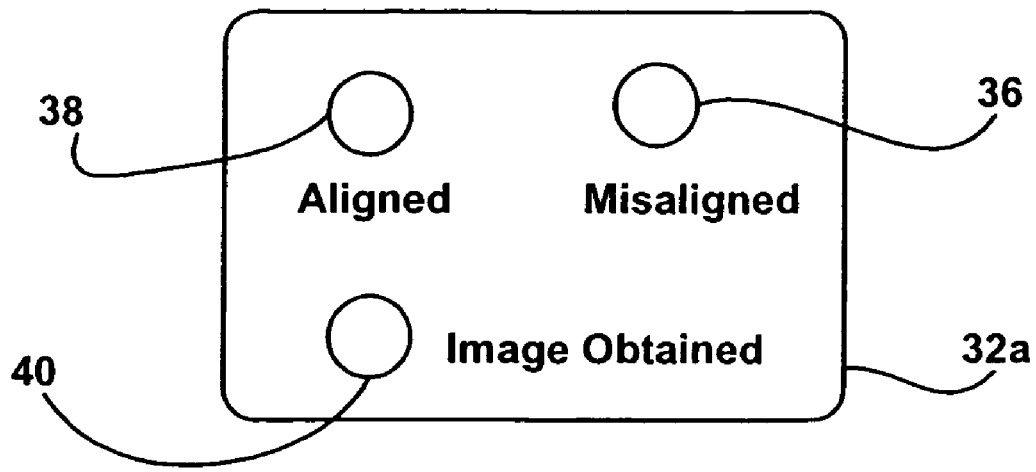
FIG. 10 is a plan view of an exemplary feedback arrangement that may form part of the handheld device of FIG. 1.

Referring now to FIG. 10, an exemplary simplified feedback configuration 32a is illustrated including three light emitting diodes (LEDs) 36, 38 and 40 that are arranged on the top surface of housing barrel 29 within easy view of an HHD operator. The LEDs are labeled as "misaligned", "aligned" and "image obtained" indicating misalignment, alignment and that an optimal image has been obtained. When HHD 20 is being used to obtain an item image, if the obtained image is not substantially similar to an optimal image, misaligned LED 36 is illuminated. Once an obtained image is substantially aligned with an optimal image, aligned LED 38 is illuminated and misaligned LED 36 is turned off. After an optimal image or at least an image that is suitable for performing feature functions associated therewith has been obtained, LED 40 is illuminated.

Figure 11:
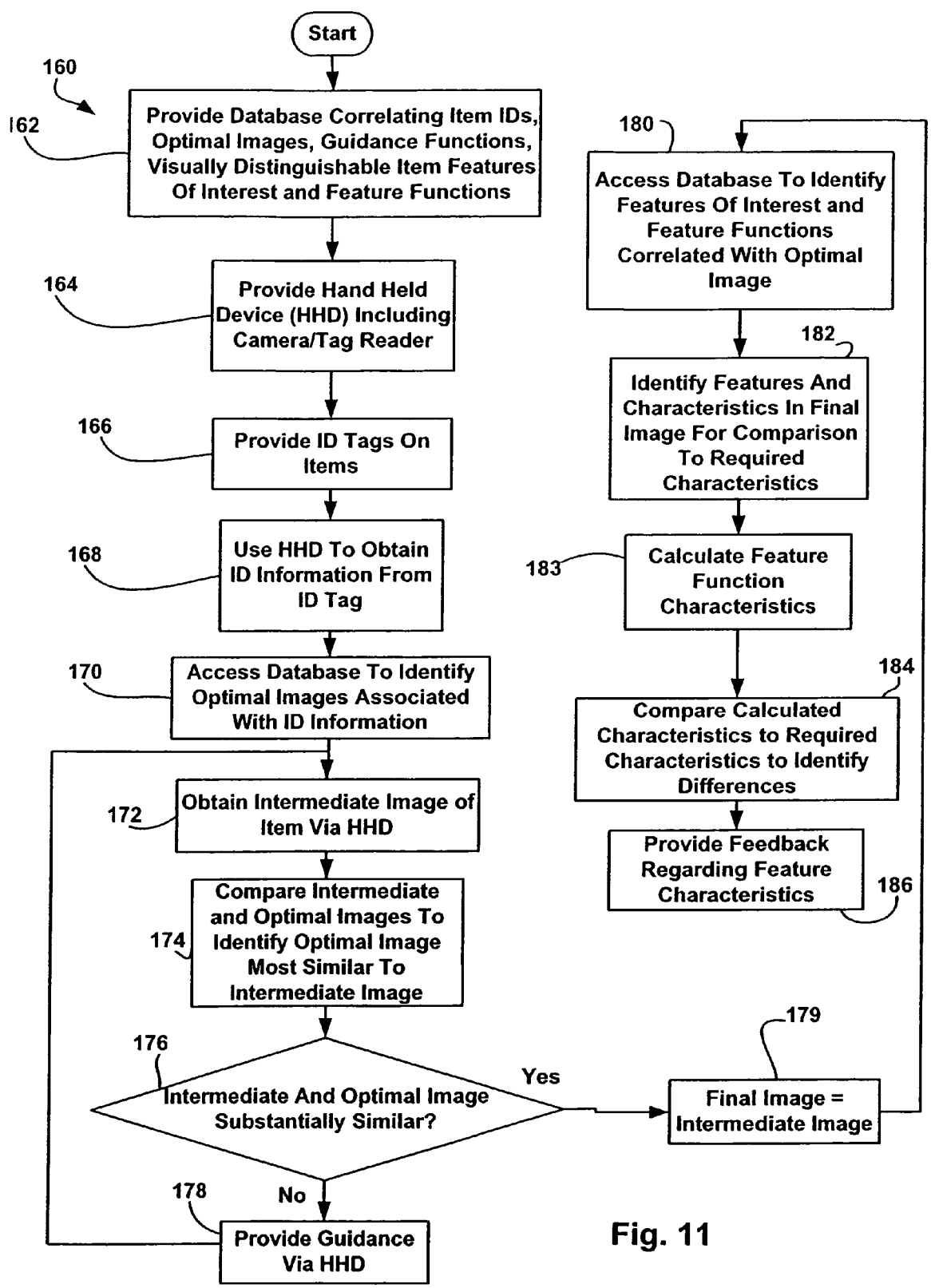
FIG. 11 is similar to FIG. 8, albeit illustrating another method according to at least some embodiments of the present invention.

Referring now to FIG. 11, an exemplary method 160 according to at least some aspects of the present invention where active guidance is provided to an HHD 20 user is illustrated. Referring also to FIGS. 1, 2, 3, 9 and 10, at block 162, a database 17' that correlates item IDs, optimal images, visually distinguishable image features and feature functions is provided. At block 164, an HHD including a camera/tag reader is provided. At block 166, ID tags are provided on items to be used with system 10. At block 168, HHD 20 is used to obtain ID information from one of the item ID tags. At block 170, HHD processor 21 accesses database 17' to identify optimal images associated with the obtained ID information. Consistent with the example above, where information has been obtained from tag 202 on blade 200, processor 21 identifies the optimal image associated with image identifier 73.

Continuing, at block 172, HHD 20 is used to obtain an intermediate image of blade 200. At block 174, processor 21 compares the compared and optimal images to identify the optimal image that is most similar to the obtained image. In the present case, because there is only one optimal image in column 76 associated with the rotor blade identification number 00-0001, the single optimal image associated with identifier 73 is identified at block 174. In other cases where two or more optimal image identifiers are listed in column 76 (e.g., in the case of blades have ID number 00-0002), processor 21 selects one of the optimal images for performing the guidance process at block 174.

After block 174, at block 176, processor 21 determines whether or not the obtained image is substantially similar to the most similar optimal image (e.g., the obtained image is suitable for sufficiently accurately performing the feature functions associated therewith). Where the obtained image is not substantially similar to the optimal image, control passes to block 178 where processor 21 provides guidance via the feedback devices (e.g., the LEDs 36, 38 and 40 in FIG. 10). After block 178, control passes back up to block 172 where the subprocess including blocks 172, 174 and 176 is repeated.

Referring once again to block 176, once the obtained image is substantially similar to one of the optimal images, control passes from block 176 to block 179 where the most recent intermediate image is used as a final image. In addition, feedback indicating alignment may be provided via LEDs 36, 38 and 40 (see again FIG. 10). At block 180, processor 21 again accesses database 17' to identify features of interest that should be visually distinguishable in the obtained image, the functions to be performed on the features and the required characteristics that are correlated with the item identification number and matching optimal image. Again, in the present example, processor 21 identifies features F1 through F12 as of interest and dimensions T1, T2, T3, L, W and C to be measured. At block 182, processor 21 attempts to identify the features of interest in the obtained image. At block 183, processor 21 uses the identified features to calculate the characteristics that are to be compared to the expected characteristics. At block 184, processor 21 compares the calculated characteristics to the expected characteristics to identify differences. At block 186, feedback regarding any differences is provided.

Here, once again, in at least some embodiments, feedback will be provided by transmitting feedback information to access point 16 and on to server 13 where server provides the feedback information via display 22. In other embodiments feedback may be provided via an audio speaker 39 (see again FIG. 1) linked to processor 21. Here, where all calculated values are within acceptable ranges, processor may generate a sound discernable as an affirmation of the product dimensions whereas, if one or more values are outside acceptable ranges some other discernible sound may be generated. In the alternative, one or two additional LEDs could be provided as part of feedback assembly 32a (see again FIG. 10) to indicate acceptable or unacceptable calculated values.

Figure 12:
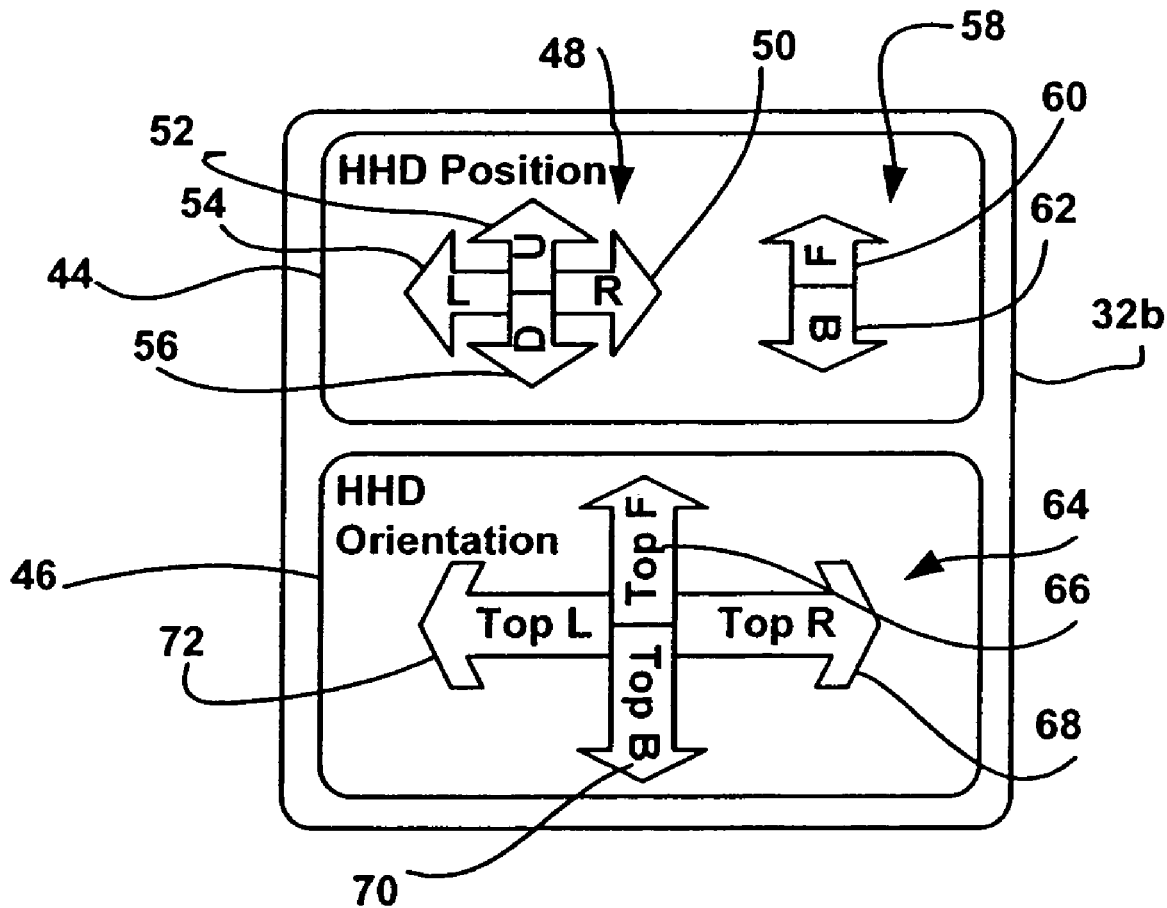
FIG. 12 is another exemplary feedback arrangement according to at least some aspects of the present invention.

Referring now to FIG. 12, a second exemplary feedback arrangement 32b is illustrated which includes ten separate arrow shaped covers provided over LEDs to provide active guidance to an HHD user for obtaining an optimal image. Here, the arrows are divided into two groups, one to indicate desirable HHD position movements within a space 44 and a second group to indicate desirable HHD orientation movement provided within a space 46. The arrows within position space 44 include an up arrow 52, a down arrow 56, a left arrow 54, a right arrow 50, a forward arrow 60 and a back arrow 62. As the labels imply, the position arrows 52, 56, 54, 50, 60 and 62 are used to indicate that an HHD user should move an HHD up, down, left, right, forward and backward with respect to an item being imaged, respectively. For instance, when an item being imaged is to the right of the center of the HHD camera field of view, arrow 50 indicating that the HHD should be moved to the right may be illuminated. Similarly, if an item appears much smaller in an obtained image than is optimal, arrow 60 may be illuminated to indicate that the HHD should be moved forward with respect to the item.

Similarly, the orientation arrows indicate how the barrel of the HHD 20 should be moved to adjust pitch and roll. For instance, when arrow 66 is illuminated, the HHD barrel 29 should be moved forward with respect to the HHD handle 27 thereby affecting a forward pitch movement. Similarly, where arrow 68 is illuminated, the barrel 29 should be rotated to the right with respect to handle 27 affecting a roll of the HHD.

Figure 13:
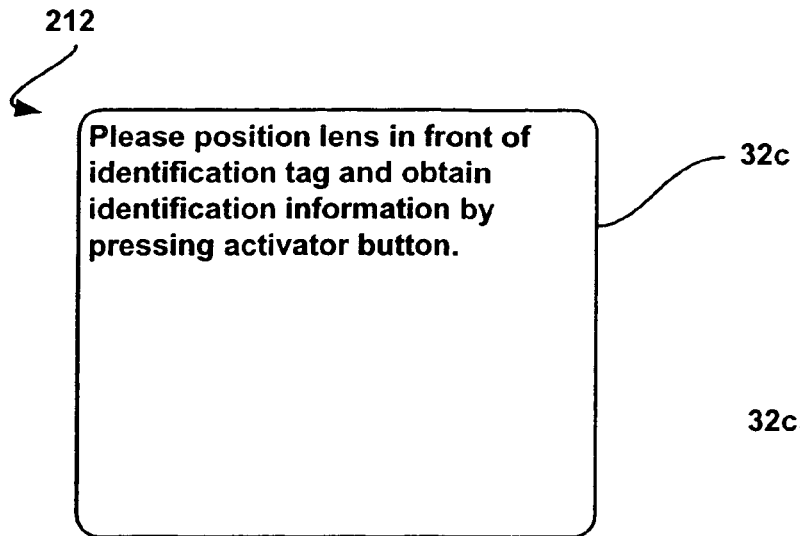
FIG. 13 is a screenshot for providing HHD guidance information according to at least some aspects of the present invention.
Figure 14:
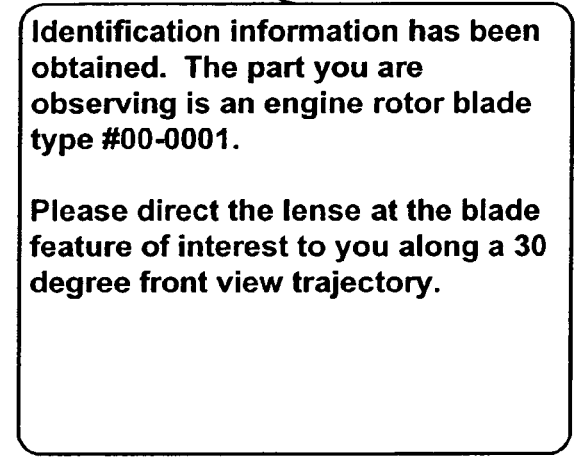
FIG. 14 is similar to FIG. 13, albeit providing other guidance information.
Figure 15:
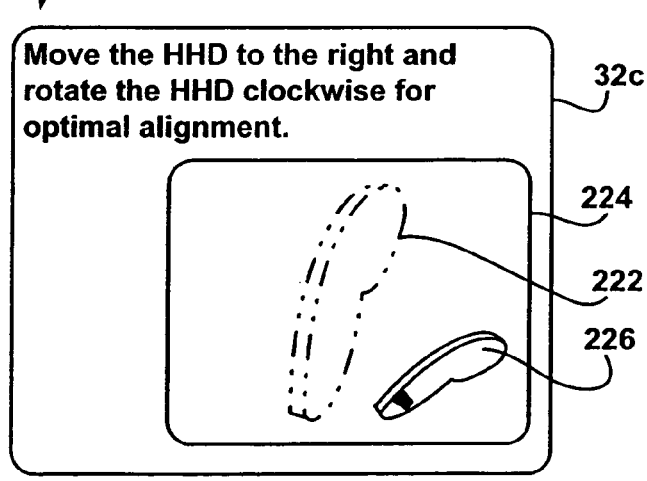
FIG. 15 is similar to FIG. 14, albeit providing other guidance information as well providing a real time image and a phantom showing an optimal image orientation.

In at least some other embodiments it is contemplated that a feedback arrangement may include a small flat panel display screen mounted directly on HHD 20. To this end, an exemplary HHD display screen 32c is best illustrated in FIG. 15 and may include text instructions 228 to guide an HHD user to obtain an optimal image as well as an actual real time video display section 224 showing a most recently obtained image 226 and, in at least some cases, a phantom image 222 overlaid over the actual image to show an optimal image.

Where an HHD 20 is equipped with its own feedback display arrangement 32c, relatively detailed instructions can be provided to an HHD user for obtaining optimal images. To this end, referring once again to FIGS. 1, 2, 3 and 9 and also to FIG. 13, initially when HHD 20 is turned on, instructions 212 may be provided via display 32c instructing HHD user to position the HHD lens 28 in front of an item identification tag (e.g., 202) to obtain identification information by pressing the activator button 30. Next, after identification information has been obtained, the HHD processor 21 identifies the item associated with the identification information and provides feedback 216 as shown in FIG. 14 that identifies the type of item as well as provides another instruction 218 to direct the lens at the blade along a 30° front view trajectory as required to obtain the optimal image (see again image indicator 73 in column 76 of FIG. 9). Once an image of the item is obtained, as illustrated in FIG. 15, the image 226 is presented within image space 224. In addition, an optimal image phantom 222 is provided within space 224 to help the HHD user to quickly and intuitively determine how the HHD position has to be modified in order to obtain the optimal image. In addition, instructions 228 are provided by the processor 21 to indicate textually how the HHD position has to be modified to obtain the optimal image.

Figure 16:
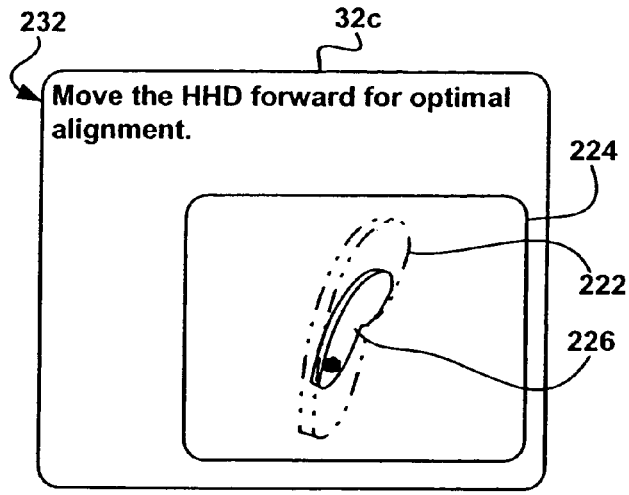
FIG. 16 is similar to FIG. 15, albeit providing other guidance instructions.

In the illustrated example, the instructions are provided in a step-wise fashion to first direct the HHD user with respect to pitch and roll, left and right and up and down movement and then to instruct the user with respect to forward and backward movement. Thus, in FIG. 15 the text instructions request that the user move the HHD to the right and rotate the HHD clockwise for optimal alignment. In FIG. 16, once the operator has moved the HHD right and rotated the HHD counter-clockwise, a new set of instructions 232 request that the user move the HHD forward for optimal alignment.

Figure 17:
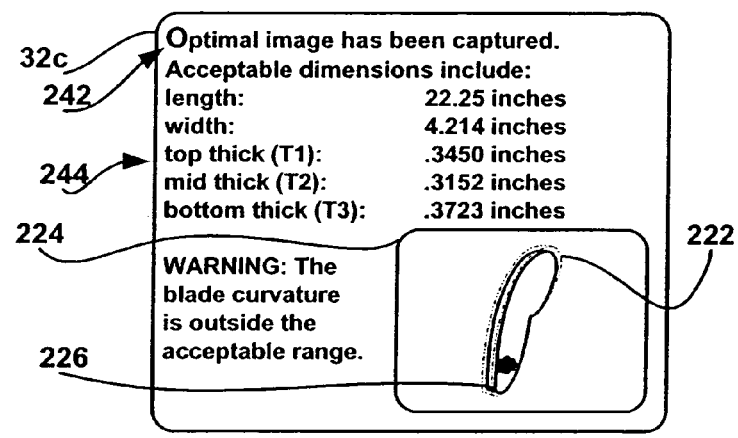
FIG. 17 is similar to FIG. 15, albeit providing results of a supplemental process after an optimal image has been obtained.

Referring to FIG. 17, after the HHD has been moved forward an appropriate amount and the obtained image 226 is substantially similar to the optimal image 222, processor 21 obtains a final image and uses that final image to identify features of interest and to calculate characteristics of interest from the features of interest. Next, in at least some applications, processor 21 compares the measured characteristics to the required characteristics and provides feedback. As illustrated in FIG. 17, in the present example, processor 21 indicates the length, width and three thicknesses of interest for the blade and indicates that, in the present case, the blade curvature is outside the acceptable range.

Referring once again to FIG. 9, as described above, in at least some cases, two or more image identifiers in column 76 may be associated with a single item identification number in column 78. Again, in FIG. 9, edge view image identifier 101 and plan view image identifier 103 are associated with item identification number 00-0002 in column 78.

Figure 18:
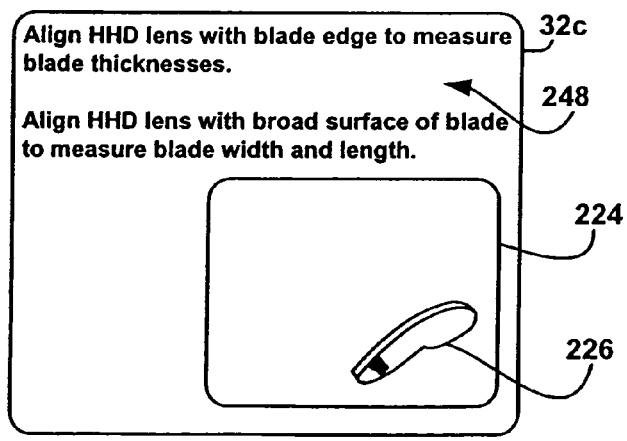
FIG. 18 is similar to FIG. 15, albeit providing alternate instructions for obtaining either of two different optimal images.

In at least some cases it is contemplated that where multiple optimal images are associated with a single item identification number and an obtained image is similar to two or more of the optimal images, processor 21 may provide alternate instructions and allow the HHD user to obtain any one of the optimal images through different movements of the HHD 20. For the purposes of the next example, referring again to FIG. 3, it will be assumed that tag 202 corresponds to item identification number 00-0002 in database 17' illustrated in FIG. 9 so that both edge view identifier 101 and plan view identifier 103 are associated with blade 200. Referring once again to FIGS. 1, 2, 5 and 9 as well as FIG. 18, after identification information has been obtained from a tag 202 on blade 200 as well as an image 226 of blade 200, processor 21 may identify either of the edge view or the plan view images associated with image identifiers 101 and 103 as possible optimal images the HHD user is attempting to obtain.

Figure 19:
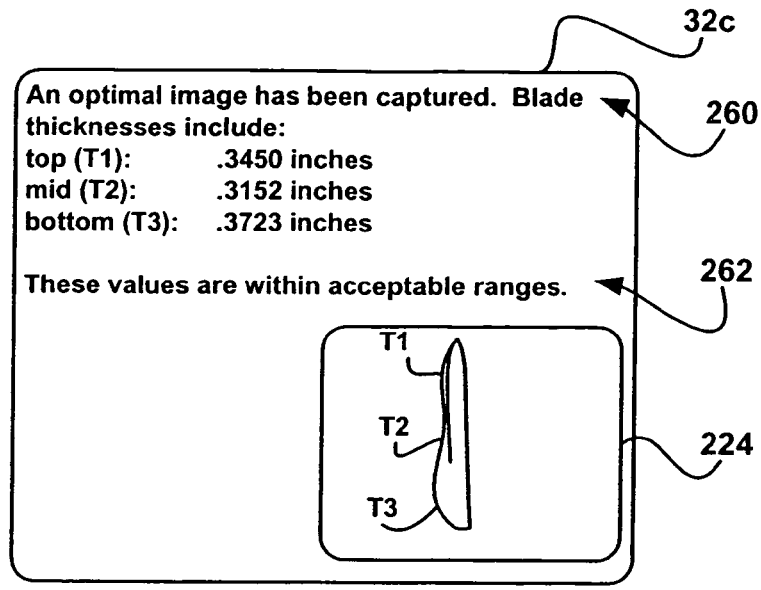
FIG. 19 is similar to FIG. 18, albeit providing results after an optimal image has been obtained.
Figure 20:
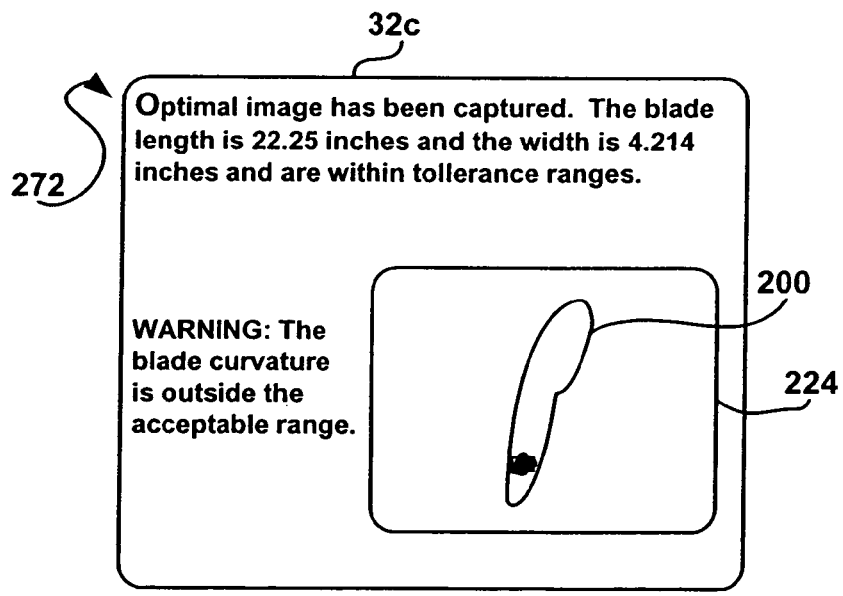
FIG. 20 is similar to FIG. 19, albeit providing results after a different optimal image has been obtained.

In this case, processor 21 may be programmed to provide alternate instructions 248 guiding the user to either align the HHD to obtain the optimal edge view image or to obtain the optimal plan view image. Referring to FIG. 19, where the HHD user follows the instructions to obtain the optimal edge view image, once the optimal image has been obtained, characteristic dimensions associated therewith including thickness T1, T2 and T3 are obtained and feedback is provided regarding the measured values 260 as well as feedback regarding whether or not the values are acceptable 262. Referring to FIG. 20, where the HHD user follows the instructions for obtaining the optimal plan view image, once the optimal plan view image is obtained, feedback 272 is provided indicating the measured values as well as providing warnings where appropriate.

In addition to the supplemental functions described above, one additional and particularly advantageous supplemental function that may be performed by system 10 includes a part verification function. To this end, in many cases identification tags are provided on products or items so that product consumers can verify that the items are genuine parts from specific manufacturers that are known to provide high quality products. Thus, for instance, to ensure that a rotor blade was manufactured by Harbinger Aero Parts, a reputable parts manufacturer, Harbinger Aero Parts may provide identification tags on each one of their rotor blades that can be used by an end user to attempt to verify authenticity. Unfortunately, part counterfeiters have begun to copy the information on identification tags and place similar tags on counterfeit parts so that end users can no longer verify part authenticity by tag information alone.

To deal with the above problem, it has been recognized that a source mark in the form of a trademark or the like can be provided either as part of an identification tag or proximate an identification tag such that when an image of the identification tag is obtained, an image of the source mark is also obtained. In this case, in addition to verifying an item identification number in an attempt to verify authenticity, the source mark can be compared to a trademark of the trusted supplier and, if the source mark is different than the trusted supplier's trademark, the part can be recognized as a counterfeit part. In addition, if the source mark is not present in the obtained image, the part can be recognized as a counterfeit part. While part counterfeiters could copy source marks as well as identification tags and use those marks and tags together in an attempt to continue to counterfeit products, copying a source mark like a trademark would be a separate trademark violation and would be relatively easily actionable.

Figure 21:
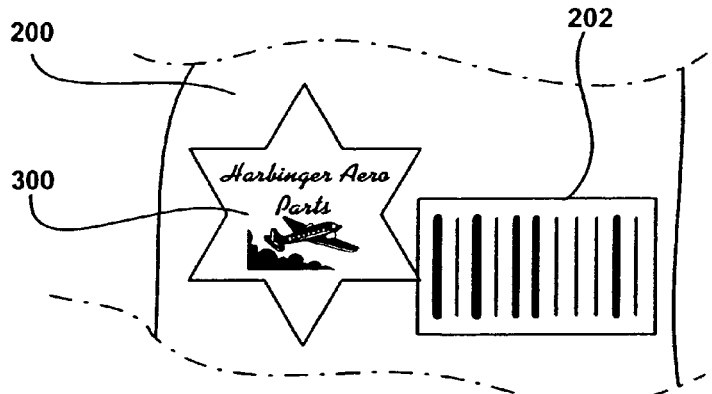
FIG. 21 is a partial plan view showing a source mark and an identification tag on an item.
Figure 22:
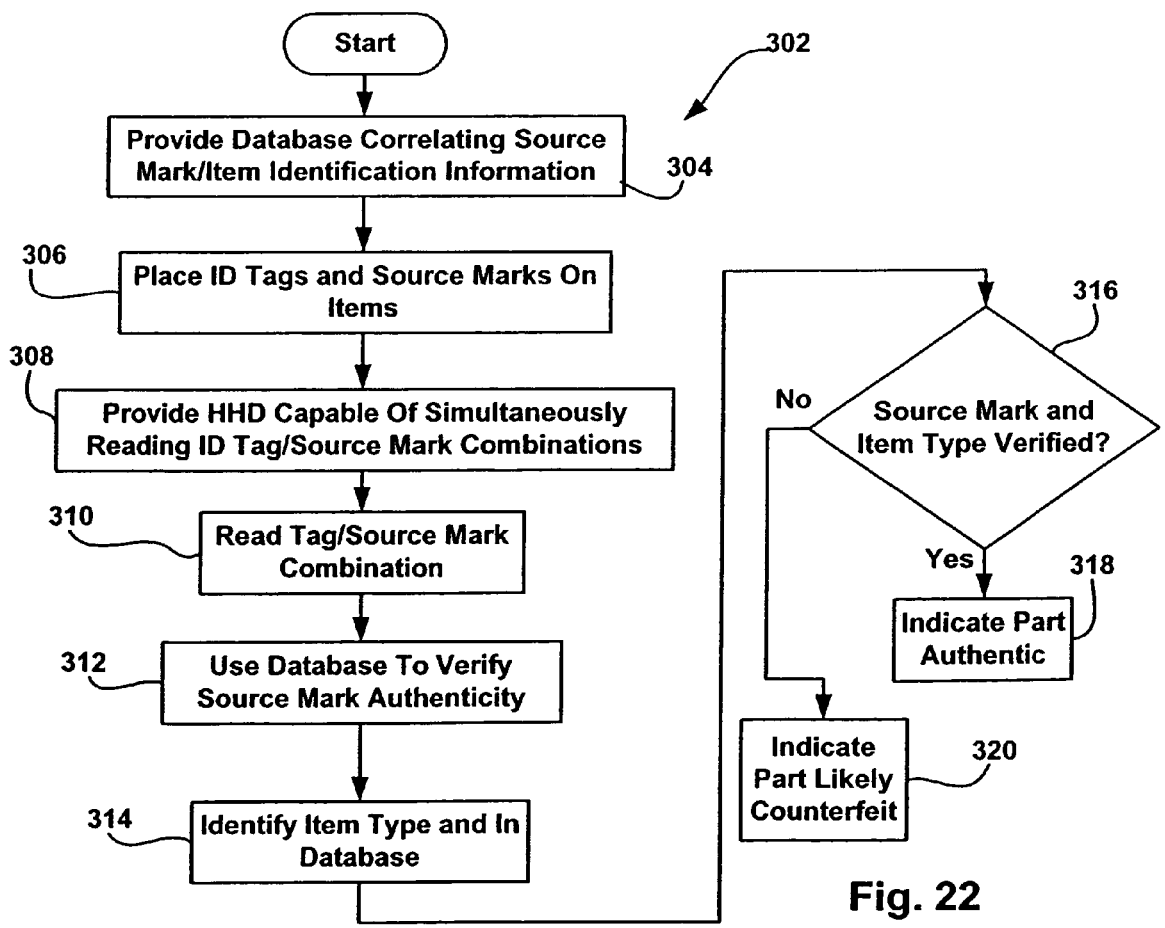
FIG. 22 is a flow chart illustrating a method for verifying parts according to at least some aspects of the present invention.

Consistent with the comments above, referring to FIG. 21, an exemplary source mark 300 is shown printed or placed on a blade 200 next to an identification tag 202 where both the mark 300 and tag 202 can be simultaneously imaged for part verification purposes. Referring also to FIG. 22, an exemplary method 302 for verifying parts using a source mark and an identification tag is illustrated. Beginning at block 304, a database is provided that correlates source marks with item identification information. At block 306 ID tags and source marks are placed on items to be used with the system 10. At block 308, an HHD 20 is provided that is capable of simultaneously reading ID tag and source mark combinations. At block 310, the HHD is used to read a tag and source mark combination. At block 312, the database is used to verify source mark authenticity. At block 314, the database is used to identify the type of item associated with the identification tag. At block 316, the HHD processor 21 determines whether or not the source mark and item type have been verified. Where the source type and item type have been verified, at block 318 processor 21 indicates that the part is authentic. In the alternative, where either the source mark or the item type has not been verified at block 316, at block 320 the HHD processor 21 indicates that the part is likely a counterfeit part. Indication may be either audible (e.g., a small speaker) or visual (e.g., an LED or the like).

In at least some cases it is contemplated that, after an HHD is used to obtain product identifying information from a tag that is placed on or associated with a particular product, the HHD will continue to be associated with the particular product for the purpose of performing supplemental functions until a transition indication or event occurs such as either new tag information being obtained from a different tag or the HHD user performing some process to indicate that the association between the HHD and the product should be broken. Thus, for instance, after identification information is obtained from a tag, HHD 20 may be used to obtain ten different optimal images of the product associated with the identification tag, the HHD processor 21 performing a different subset of supplemental functions for each one of the obtained images without having to reassociate with the product each time a new image is obtained. At any time, if the HHD is used to obtain information from a different ID tag, HHD 20 association with the previous product is broken and a new HHD product association is formed with the new product.

Figure 23:
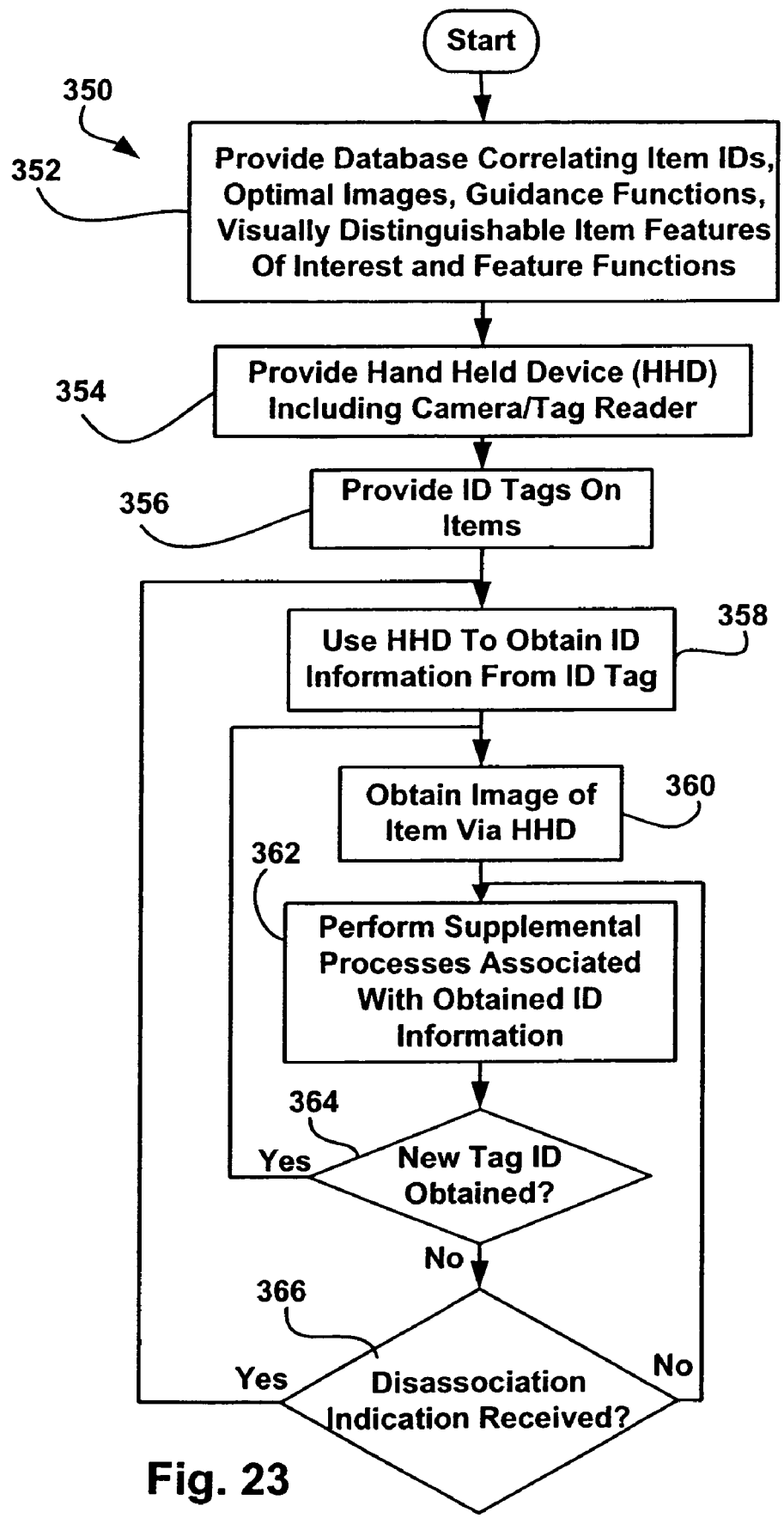
FIG. 23 is a flow chart illustrating a method for associating a portable device with a product for processing.

Consistent with the comments in the previous paragraph, referring now to FIG. 23, another method 350 that is consistent with at least some aspects of the present invention is illustrated. Referring also to FIGS. 1, 2 and 5, at block 352, a database is provided that correlates item IDs, optimal images, guidance functions, visually distinguishable item features of interest and feature functions. At process block 354, a HHD 20 including a camera/tag reader is provided. At block 356, ID tags are provided on items or products. At block 358, HHD 20 is used to obtain ID information from an ID tag located on one of the products. At block 360, HHD 20 is used to obtain an image of the product including the tag from which identification information was most recently obtained. At block 362, HHD processor 21 performs supplemental processes associated with the obtained identification information. At block 364, HHD processor 21 determines whether or not new tag identification information has been obtained. Where new tag identification information has not been obtained, control passes down to block 366. At block 366, processor 21 determines whether or not some other disassociating indication has been received by the HHD. Here, for instance, a disassociating indication may include holding the activation button 30 in for more than 5 continuous seconds. Where no other disassociating indication has been received, control passes back up to block 362 where the sub-loop including blocks 362, 364 and 366 continues. Referring again to block 366, where a different disassociating indication is received, control passes back up to block 358 where the HHD processor 21 waits to receive new ID tag information. Referring once again to block 364, where new tag ID information is obtained, control passes back up to block 360 where processor 21 waits for a new image to be obtained via HHD 20.

Figure 24:
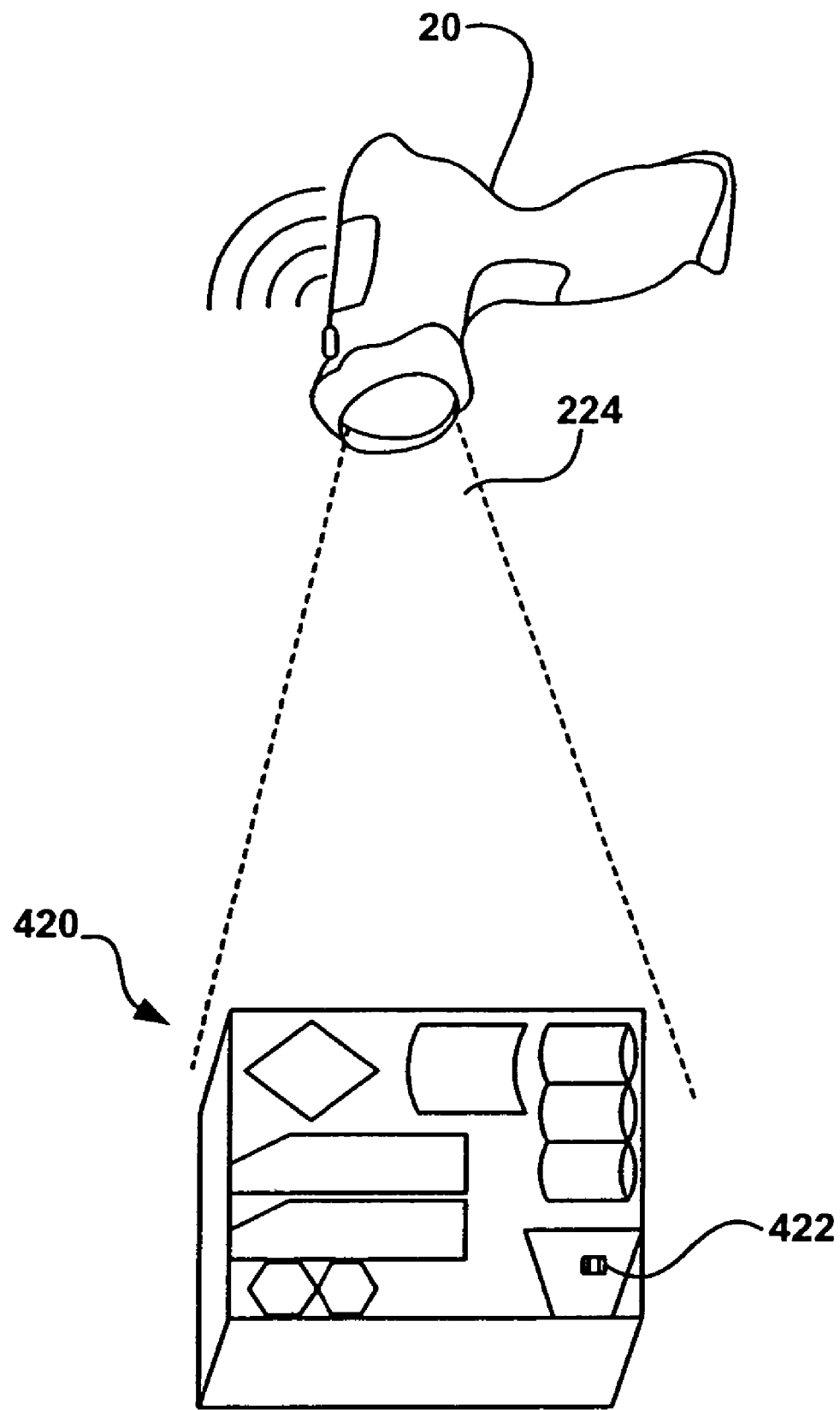
FIG. 24 is a schematic diagram illustrating an HHD being used to obtain an image of a kit including various components according to at least some aspects of the present invention.

While the invention may be susceptible to various modifications and alternative forms, specific embodiments have been shown by way of example in the drawings and have been described in detail herein. However, it should be understood that the invention is not intended to be limited to the particular forms disclosed. For example, other supplemental processes are contemplated. For instance, kit component verification is contemplated. To this end, referring to FIG. 24, a kit 420 is illustrated that includes a number of components where at least one of the components includes a tag 422. Here, the tag information may be associated with a list of kit components in a database where image features include instances of the kit components along with instructions regarding how to identify the components in an image, the feature function being to identify each list component in an obtained image. When an image of a kit is obtained, the HHD processor 21 may be programmed to identify the tag in the image, obtain kit identification information from the tag, identify the kit image and component list, attempt to identify the kit components in the image and then provide feedback regarding whether or not the kit is complete and any components that do not appear in the kit.

In addition, systems are contemplated wherein a portable HHD may be associated with an item in ways other than obtaining tag information from a tag that resides on the item. For instance, in at least some cases a tag may reside in a parts booklet or the like where the tag is spatially associated (e.g., on the same page in the booklet) with an image of the item/product. For instance, a tag for a rotor blade as described above may be presented next to an optimal image. Here, an HHD user could obtain tag information from the booklet to associate the HHD temporarily with an item and then perform image obtaining processes and other supplemental processes using the HHD as described above. Similarly, an end process or disassociation tag may be included in a booklet or elsewhere in proximity to where an HHD is used to disassociate the HHD with an item that the HHD is currently associated with.

Moreover, while some systems are described above as including guidance capabilities, in at least some cases it is contemplated that no guidance functions may be provided. Similarly, while some systems are described above that include association via a tag, in some cases such association may not be supported. For instance, where an HHD is used with a single item type, the HHD may be preprogrammed for use with the single item type and the supplemental processes may all be the same regardless of the instance of the item that is imaged. Here there is still value in the inventive concepts as different processes may be performed depending on which image is obtained and depending on the quality of the images obtained.

Furthermore, various types of commissioning procedures are contemplated wherein items having known standard characteristics are imaged to generate at least one optimal image for each item and then features on the items are identified as well as feature characteristics of interest and acceptable ranges of characteristic values. The present invention may be used with any type of commissioning procedure that generates suitable database information.

In addition, while the inventive aspects have been described above in the context of an HHD including a camera/sensor capable of obtaining both ID tag information as well as images of products/items, it should be appreciated that other HHD configurations are contemplated where the camera and the tag reader are separate HHD components. Here, note that the tag reader may take several forms including a bar code reader, an optical character recognition reader, an RF sensor, etc.

Moreover, instead of storing optimal images to facilitate guidance, other types of information that reflect optimal images may be stored. For instance, general orientation of edges of a product may be stored along with ranges of dimensions for comparison to similar features and dimensions in obtained images.

Thus, the invention is to cover all modifications, equivalents, and alternatives falling within the spirit and scope of the invention as defined by the following appended claims. To apprise the public of the scope of this invention, the following claims are made:

What is claimed is:

1. A method for use with a database and a portable device including a processor, the method for performing functions associated with different items, the method comprising the steps of:
    providing identification tags on each of a plurality of items, each tag including identifying information useable to specifically identify an associated item;
    obtaining item identifying information from at least one identification tag corresponding to a specific item via the portable device;
    identifying supplemental processes as a function of the item identifying information;
    obtaining other information associated with the specific item including at least one image of the specific item via the portable device;
    performing the supplemental processes on the other information associated with the specific item; and
    when a transition indication is received, halting ongoing supplemental processes.

2. The method of claim 1 wherein the transition indications include one of obtaining item identifying information from at least one other of the identification tags and receiving an end process indication via the portable device.

3. The method of claim 2 further including the step of providing a database for storing supplemental processes associated with specific item identifying information and wherein the step of identifying supplemental processes includes accessing the database to identify supplemental processes associated with the item identifying information.

4. The method of claim 2 wherein at least a subset of the supplemental processes include obtaining multiple images of the item and analyzing various item features.

5. The method of claim 4 wherein the step of analyzing various features includes determining dimensions of features in multiple obtained images.

6. The method of claim 4 wherein the multiple images are obtained along at least two different trajectories and wherein different sub-processes are performed using images from at least two different trajectories.

7. The method of claim 1 wherein the supplemental processes include one of measurement, inspection and alignment.

8. An apparatus for use with items that include identification tags where each tag includes item identifying information, the apparatus comprising:
    a portable housing;
    a processor mounted within the housing;
    a tag information obtainer supported by the housing for obtaining information from the tags; and
    a camera supported by the housing;
    wherein, the processor runs a program to, when item identifying information is obtained from a tag associated with a specific item via the obtainer, identify supplemental processes as a function of the item identifying information, perform the supplemental processes associated with the specific item on other information obtained by the processor, wherein the other information includes other information associated with the specific item including at least one image of the specific item until a transition indication is received and, when a transition indication is received, halt the supplemental processes associated with the specific item.

9. The apparatus of claim 8 wherein the transition indications include one of obtaining item identifying information from at least one other of the identification tags and receiving an end process indication.

10. The apparatus of claim 8 wherein the supplemental processes include one of measurement, inspection and alignment.

11. The method of claim 10 wherein at least a subset of the supplemental processes include obtaining multiple images of the item and analyzing various item features.

12. The method of claim 11 wherein the step of analyzing various features includes determining dimensions of features in multiple obtained images.

13. The method of claim 11 wherein the multiple images are obtained along at least two different trajectories and wherein different sub-processes are performed using images from at least two different trajectories.

14. The method of claim 10 further including the step of providing a database for storing supplemental processes associated with specific item identifying information and wherein the step of identifying supplemental processes includes accessing the database to identify supplemental processes associated with the item identifying information.

15. The method of claim 10 wherein at least a subset of the supplemental processes include obtaining multiple images of the item and analyzing various item features.

* * * * *